(12) United States Patent
Van Bommel et al.

(10) Patent No.: US 7,538,934 B2
(45) Date of Patent: May 26, 2009

(54) SURFACE FORCE DRIVEN SUSPENDED PARTICLE DEVICES

(75) Inventors: Ties Van Bommel, Eindhoven (NL); Hikmet Rifat Ata Mustafa, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/571,060

(22) PCT Filed: Jun. 23, 2005

(86) PCT No.: PCT/IB2005/052071

§ 371 (c)(1),
(2), (4) Date: Aug. 8, 2007

(87) PCT Pub. No.: WO2006/000996

PCT Pub. Date: Jan. 5, 2006

(65) Prior Publication Data

US 2008/0037105 A1    Feb. 14, 2008

Related U.S. Application Data

(60) Provisional application No. 60/583,140, filed on Jun. 25, 2004.

(51) Int. Cl.
*G02B 26/00* (2006.01)
*G02F 1/03* (2006.01)
(52) U.S. Cl. ........................ 359/296; 359/245
(58) Field of Classification Search ............... 359/296
See application file for complete search history.

(56) References Cited

U.S. PATENT DOCUMENTS

2002/0113920 A1   8/2002   Kubota et al.
2002/0154265 A1*  10/2002  Hubby, Jr. ................. 349/159
2003/0025445 A1   2/2003   Lee

FOREIGN PATENT DOCUMENTS

WO        0188607 A1    11/2001
WO       03071347 A1     8/2003
WO     2004077124 A1     9/2004

OTHER PUBLICATIONS

Tanya Z. Kosc, Kenneth L. Marshall, Stephen, D. Jacobs, John C. Lambropoulos, and Sadeg M. Faris, "Electric-Field-Induced Motion of Polymer Cholesteric Liquid-Crystal Flakes in a Moderately Conductive Fluid", Applied Optics, Optical Society of America, Washington, US, vol. 41, No. 25, Sep. 1, 2002, pp. 5362-5366, XP001130483, ISSN: 003-6935, the whole document.

* cited by examiner

*Primary Examiner*—Jordan M. Schwartz
*Assistant Examiner*—James C Jones

(57) ABSTRACT

An optical device employs a fluid host medium (30) including a polar liquid (31) and an apolar liquid (32). The optical device further employs one or more electro-optically sensitive flakes (40-42) disposed within fluid host medium (30). To facilitate a switching of the optical device among a plurality of optical states (e.g., varying degrees of light reflecting states, light absorbing states, light fluorescing states and/or light transmitting states), each flake (40-42) has one or more hydrophilic layers (44) interfacing with the polar liquid (31) and/or one or more hydrophobic layers (45) interfacing with the apolar liquid (32).

33 Claims, 27 Drawing Sheets

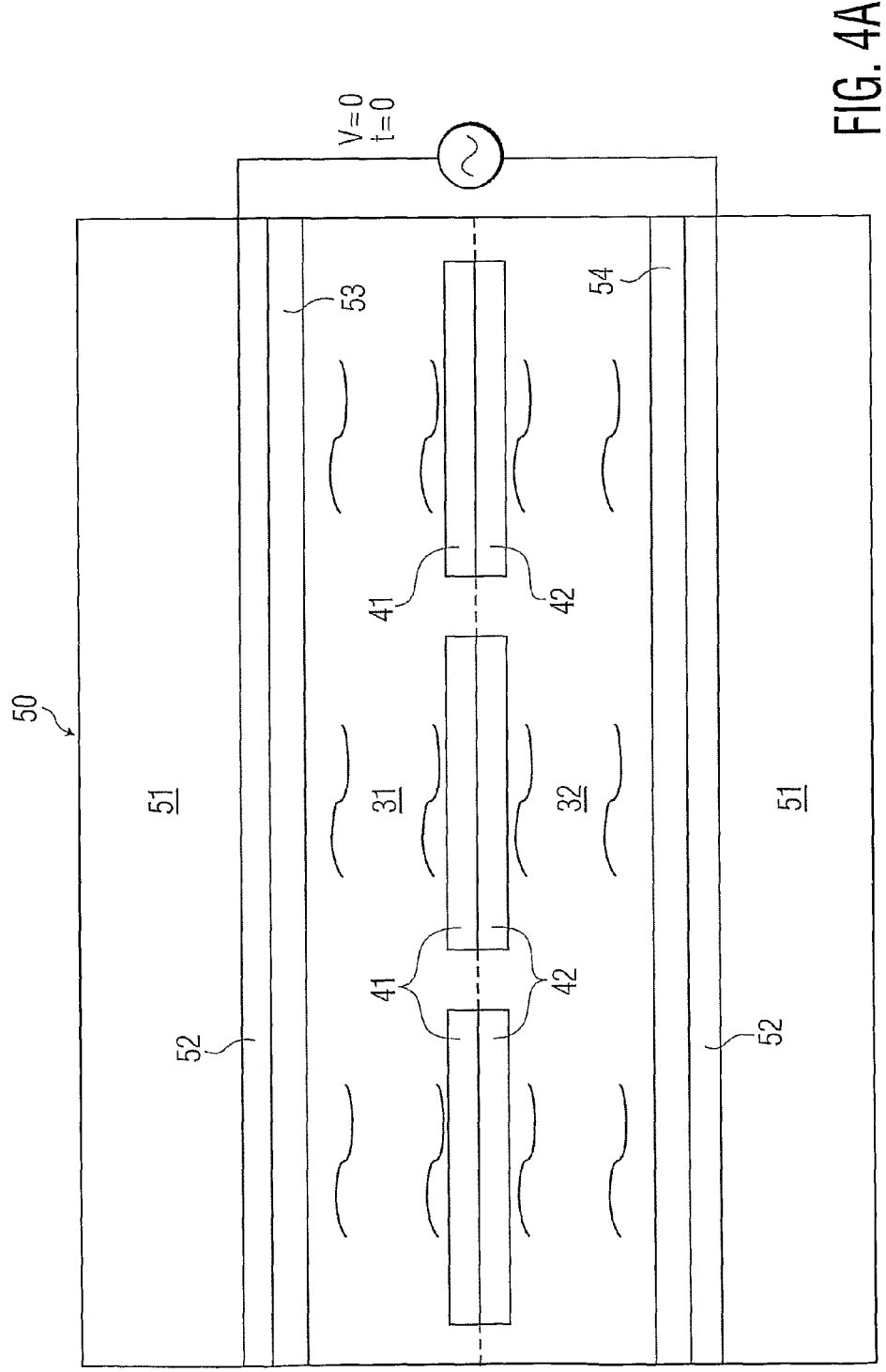

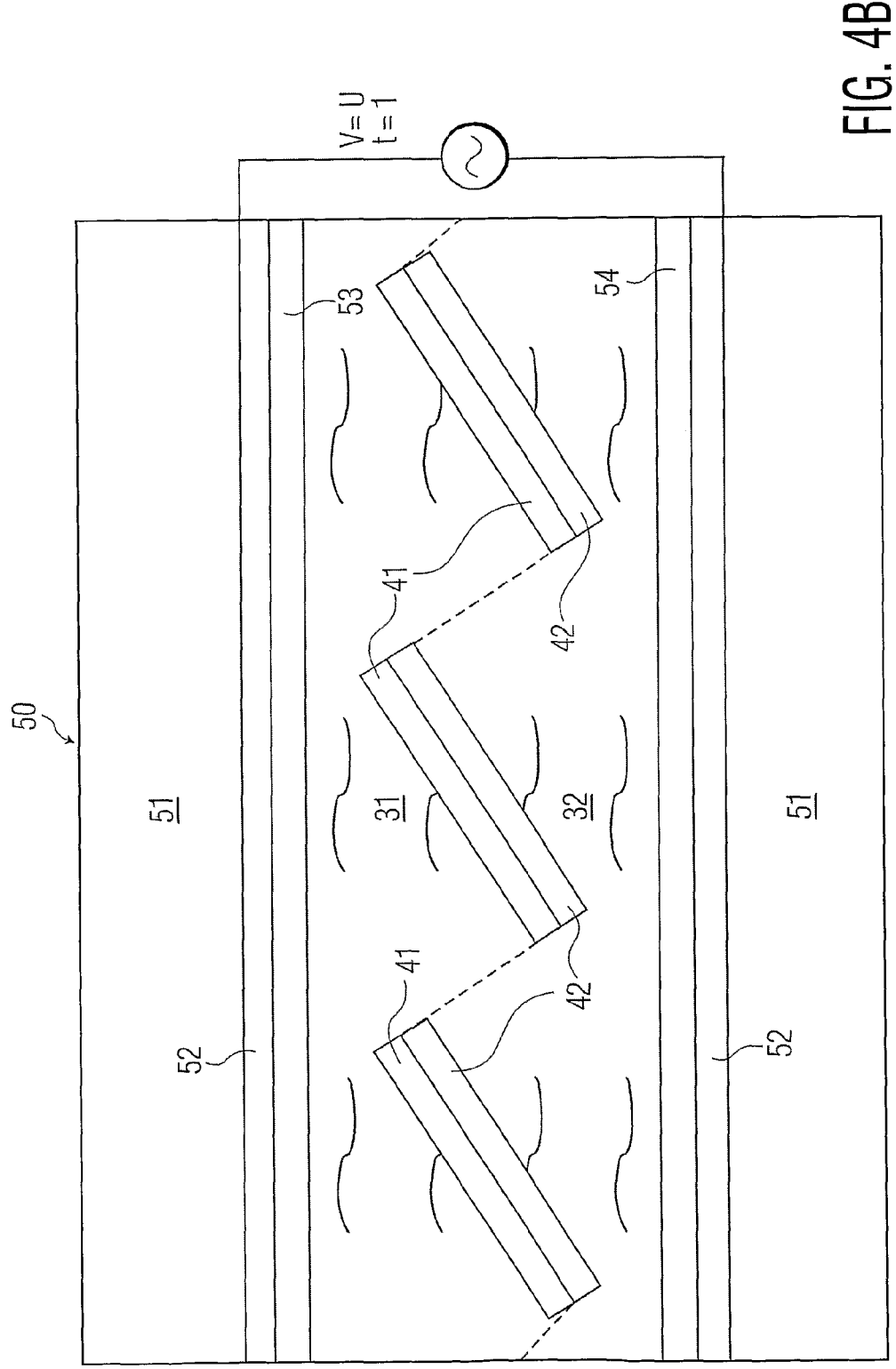

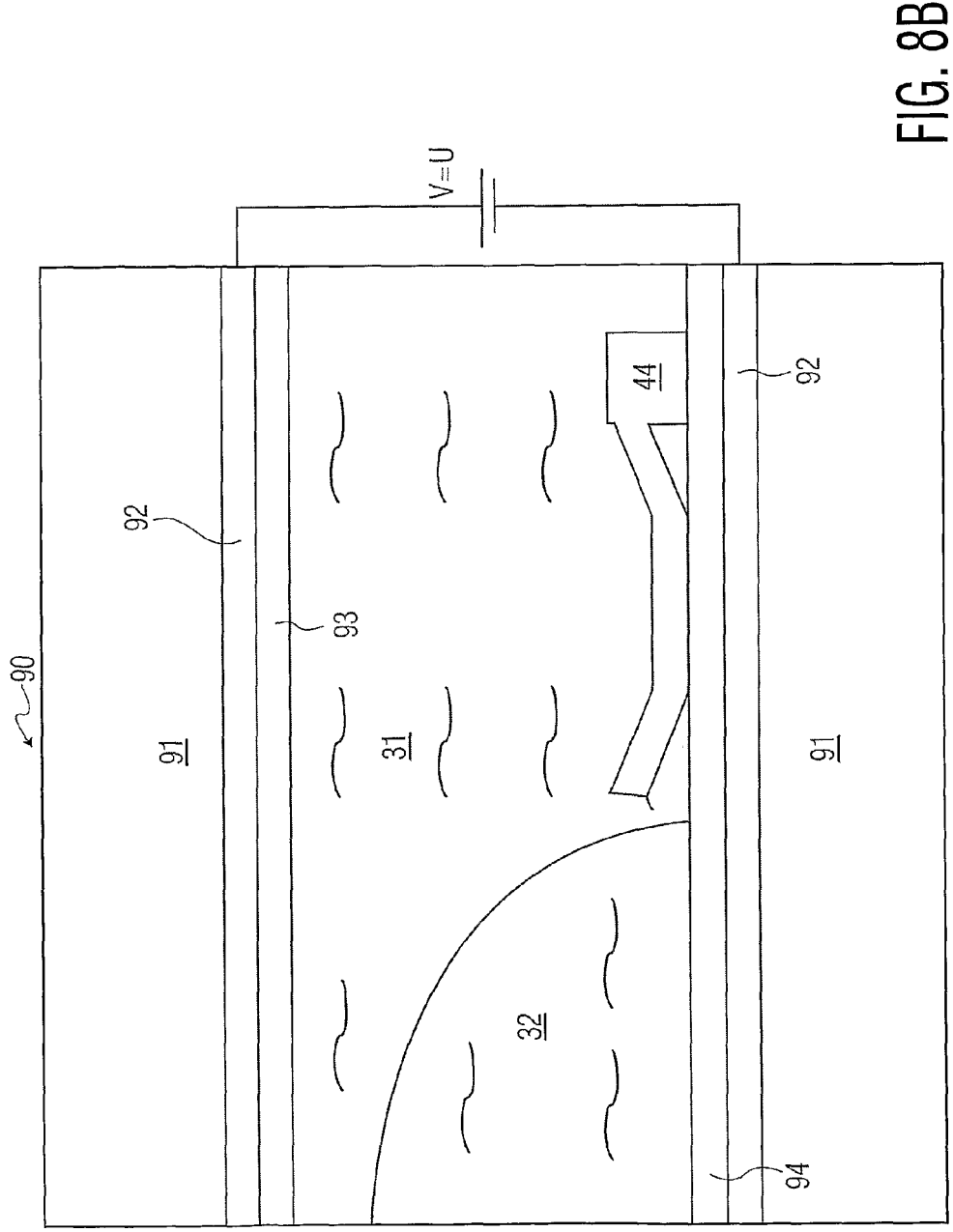

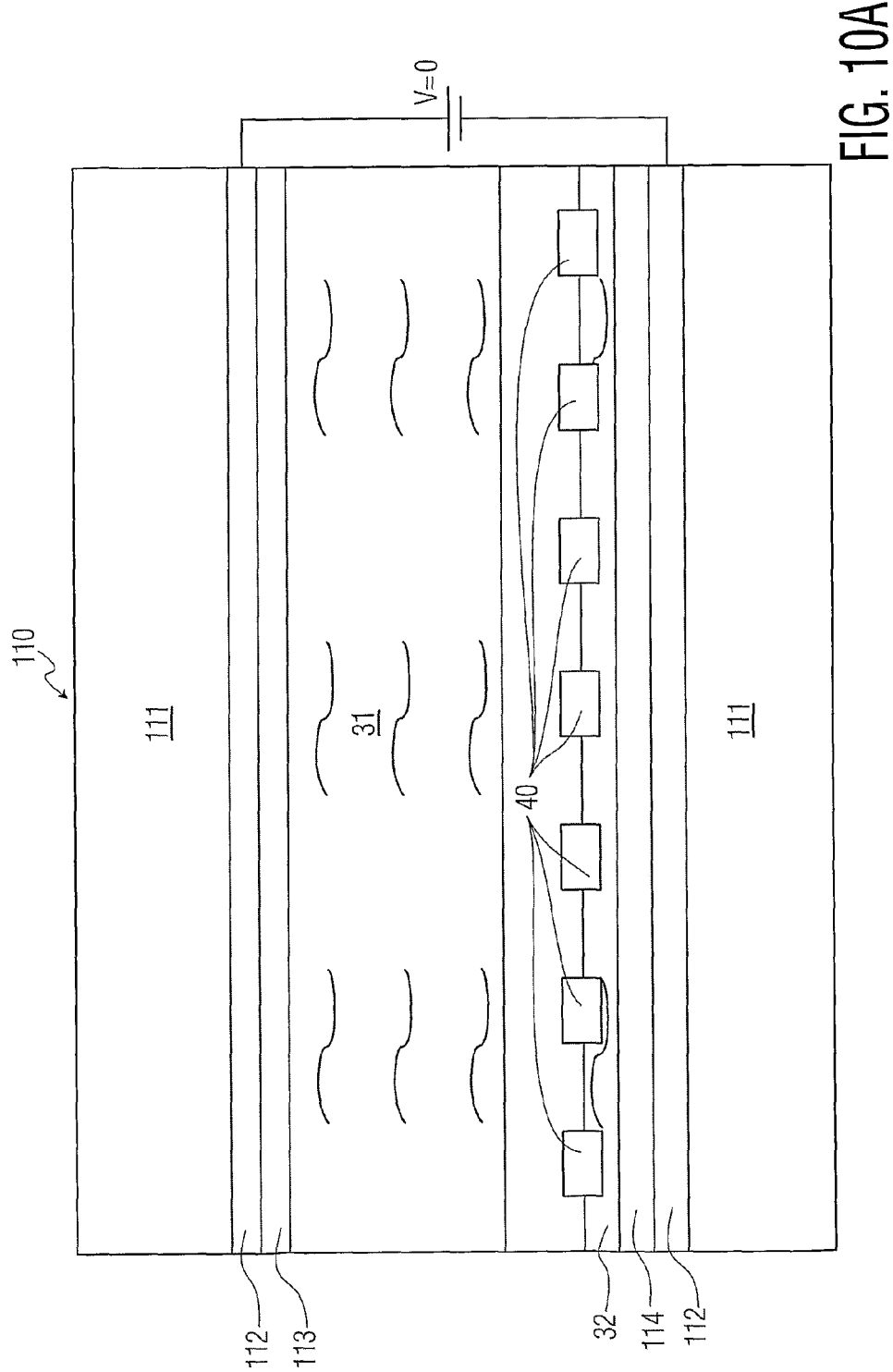

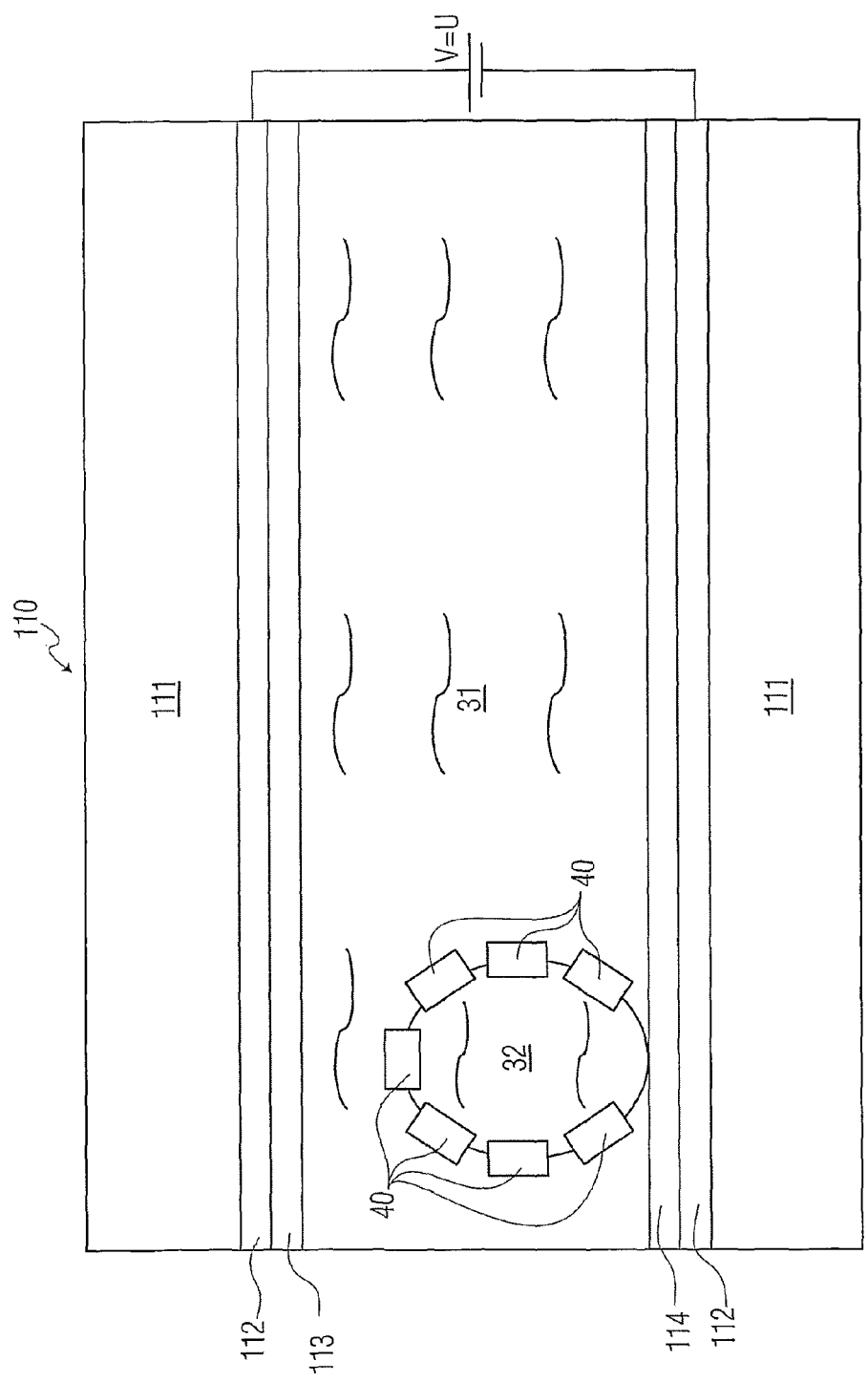

SURFACE FORCE DRIVEN SUSPENDED PARTICLE DEVICES

CROSS REFERENCE TO RELATED APPLICATION

This application claims the benefit of U.S. provisional application Ser. No. 60/583140, filed Jun. 25, 2004, which the entire subject matter is incorporated herein by reference.

The present invention generally relates to optical devices employing electro-optically sensitive flakes disposed in a fluid host medium (e.g., reflective displays). The present invention specifically relates to controlling a switching of such optical devices between various optical states (e.g., varying degrees of light reflecting states, light absorbing states, light fluorescing states and/or light transmitting states).

FIGS. 1A and 1B illustrate a known optical device 20 having a cell conventionally defined by a pair of glass substrates 21 and a pair of electrodes 22. Within the cell is a fluid host medium 23 having electro-optically sensitive flakes 24 suspended therein. In the absence of an electric field being applied to the cell as illustrated in FIG. 1A, flakes 24 are randomly suspended within fluid host medium 23 whereby optical device 20 is operating in an optical state suitable for primarily reflecting, absorbing, or fluorescing light. When a vertically extending electric field U is applied to the cell as illustrated in FIG. 1B, flakes 24 are uniaxially aligned within fluid host medium in the vertical direction of applied electric field U whereby optical device 20 is operating in an optical state suitable for primarily transmitting light.

Optical device 20 fails to provide a capability of orienting flakes 24 parallel to substrates 21 and electrodes 22 in the absence of the electric field. Consequently, a rapid switching between the light reflecting/absorbing/fluorescing state illustrated in FIG. 1A and the light transmitting state illustrated in FIG. 1B is difficult under operating conditions requiring a rapid switching of optical device 20 between the two states (e.g., a light display). The lighting industry is therefore continually striving to improve upon the existing technology related to optical devices employing electro-optically sensitive flakes disposed in a fluid host medium.

To this end, the present invention provides new and unique structural configurations of a fluid host medium and electro-optical sensitive flakes for inducing desired orientations of the flakes within the fluid host medium.

One form of the present invention is an optical device employing a fluid host medium including a polar liquid and an apolar liquid. The optical device further employs one or more electro-optically sensitive flakes disposed within fluid host medium to facilitate a switching of the optical device among a plurality of optical states (e.g., varying degrees of light reflecting states, light absorbing states, light fluorescing states and/or light transmitting states).

A second form of the present invention is an optical device employing a fluid host medium, and one or more electro-optically sensitive flakes disposed within the fluid host medium. Each flake has a hydrophilic surface and a hydrophobic surface to facilitate a switching of the optical device among a plurality of optical states.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

FIGS. 4A-4C illustrate a first embodiment of an optical device in accordance with the present invention;

FIGS. 8A and 8B illustrate a fifth embodiment of an optical device in accordance with the present invention;

FIGS. 10A and 10B illustrate a seventh embodiment of an optical device in accordance with the present invention;

The drawings illustrated in FIGS. 1A-13C are not intended to be drawn to scale, but to facilitate an understanding of various principles of the present invention. Those having ordinary skill in the art will appreciate that, in practice, the actual shapes, dimensions and material construction of a cell, a fluid host medium and electro-optically sensitive flakes as well as other components of an optical device in accordance with the present invention are dependent upon an intended commercial application of the optical device. Thus, the inventors of the present invention do not impose any restrictions as to the shapes, dimensions and material construction of each component of an optical device in accordance with the present invention, and do not assert any "best" shape or any "best" dimension or any "best" material construction of each component of an optical device in accordance with the present invention.

Figure 2A:
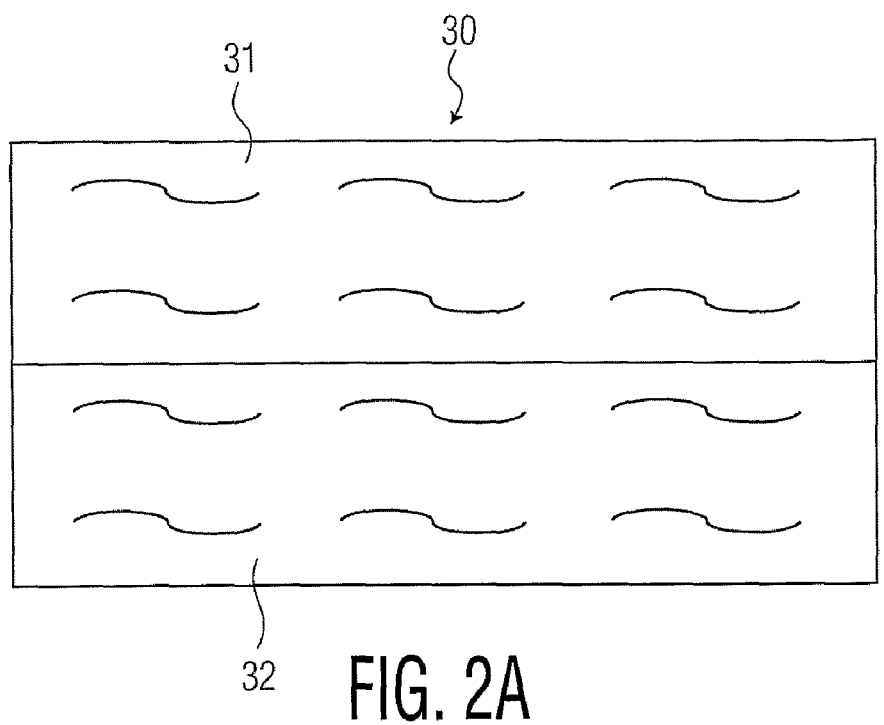
FIGS. 2A and 2B illustrate an exemplary embodiment of a fluid host medium in accordance with the present invention.
Figure 2B:
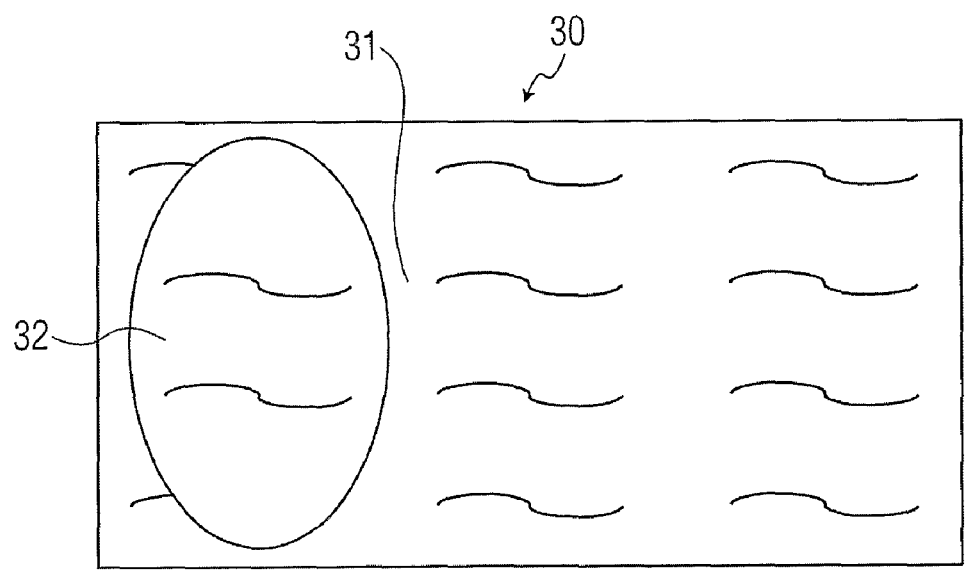

One inventive principle of the present invention is to structurally construct a fluid host medium including a polar liquid and an apolar liquid, such as, for example, water and heptane, respectively. To induce desired orientations of electro-optically sensitive flakes within the fluid host medium, the present invention takes advantage of an interfacing of the polar liquid and the apolar liquid. For example, FIG. 2A illustrates an exemplary fluid host medium 30 having an opposing interface of a polar liquid 31 and an apolar liquid 32, and FIG. 2B illustrates fluid host medium 30 having an encircling interface of a droplet of apolar liquid 32 within a polar liquid 31.

In practice, the structural construction of a cell enclosing the fluid host medium, and the material composition of the polar liquid and the apolar liquid are dependent upon a commercial implementation of the present invention, and are therefore without limit.

Figure 3A:
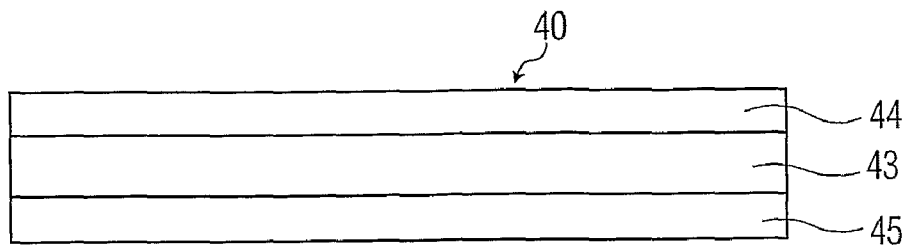
FIGS. 3A-3C illustrates exemplary embodiments of an electro-optically sensitive flake in accordance with the present invention.
Figure 3B:
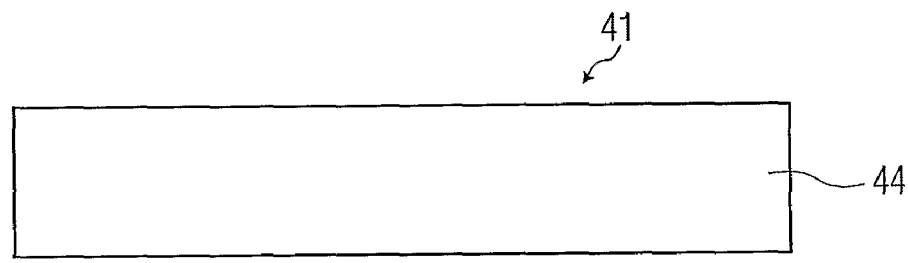
Figure 3C:
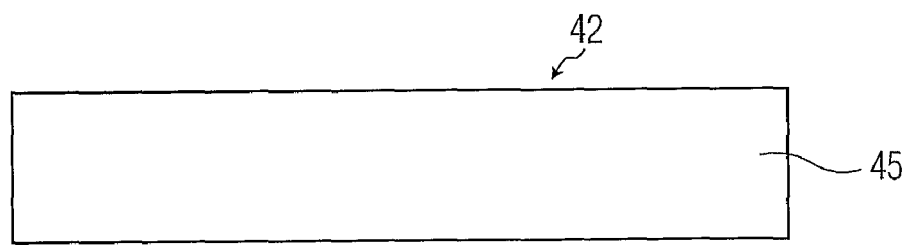

A second inventive principle of the present invention is to structurally construct each electro-optically sensitive flake with a material composition having one or more hydrophobic surfaces and/or one or more hydrophilic surfaces. Each flake consists of organic material, inorganic material, or any combination thereof. Each flake may naturally have hydrophobic surface(s) and/or hydrophilic surface(s), or be treated to have hydrophobic surface(s) and/or hydrophilic surface(s). Furthermore, the flakes may reflect, absorb and/or fluoresce light. FIG. 3A illustrates an exemplary flake 40 with a core 43 having a hydrophilic surface 44 and a hydrophobic surface 45, FIG. 3B illustrates an exemplary flake 41 having hydrophobic surface 44, and FIG. 3C illustrates an exemplary flake 42 having hydrophilic surface 45.

In practice, the structural construction and the material composition of each flake are dependent upon a commercial implementation of the present invention, and are therefore without limit. In one embodiment of flake 40 (FIG. 3A), 2.5 micron PET film was used and 50 nm of gold (Au) layer was evaporated on top of it. Flakes of this material are thereafter immersed for two (2) minutes in an ethanol solution containing hydrophilic PEG-thiols, which results in a hydrophilic self assembled monolayer on the gold surface. One of the PET surfaces is not covered with anything therefore it is hydrophobic. The other surface on the other hand is covered with gold and a PEG-thiol which is hydrophilic. In this way a flake with hydrophobic and hydrophilic surfaces are produced. To verify proper material construction of the flakes, the flakes are immersed into a bottle containing hepthane (i.e., the apolar liquid) and water (i.e., the polar liquid). The flakes immediately went to the interface of hepthane and water whereby the hydrophilic layers interface with the water and the hydrophobic layers interface with the heptane.

A third inventive principal of the present invention is to induce desired orientations of electro-optically sensitive flakes within the fluid host medium by taking advantage of an interfacing the hydrophilic layer(s) of a flake to a polar liquid, an interfacing of the hydrophobic layer(s) of a flake to an apolar liquid, a repulsive interaction of the hydrophilic layer(s) of a flake to an apolar liquid, and/or a repulsive interaction of the hydrophobic layer(s) of a flake to a polar liquid. In one embodiment, the flakes are suspended along an interfacing of the polar liquid and the apolar liquid whereby each flake orients its long axis in a direction of an ac electric field applied to the fluid host medium as will be further described in connection with FIGS. 4A-6. In a second embodiment, the configuration of each flake is altered based on the relative movement of the polar liquid and the apolar liquid in response to an electro-wetting involving an application of a DC electric field to the fluid host medium as will be further described in connection with FIGS. 7A-8B. In a third embodiment, the flakes are suspended along an interfacing of the polar liquid and the apolar liquid whereby each flake orients itself based on the relative movement of the polar liquid and the apolar liquid in response to in response to an electro-wetting involving an application of a DC electric field to the fluid host medium as will be further described in connection with FIGS. 9A-13C.

The following descriptions of FIGS. 4A-13B provide exemplary embodiments of the present invention incorporating one or more of the aforementioned inventive principles of the present invention.

Figure 4C:
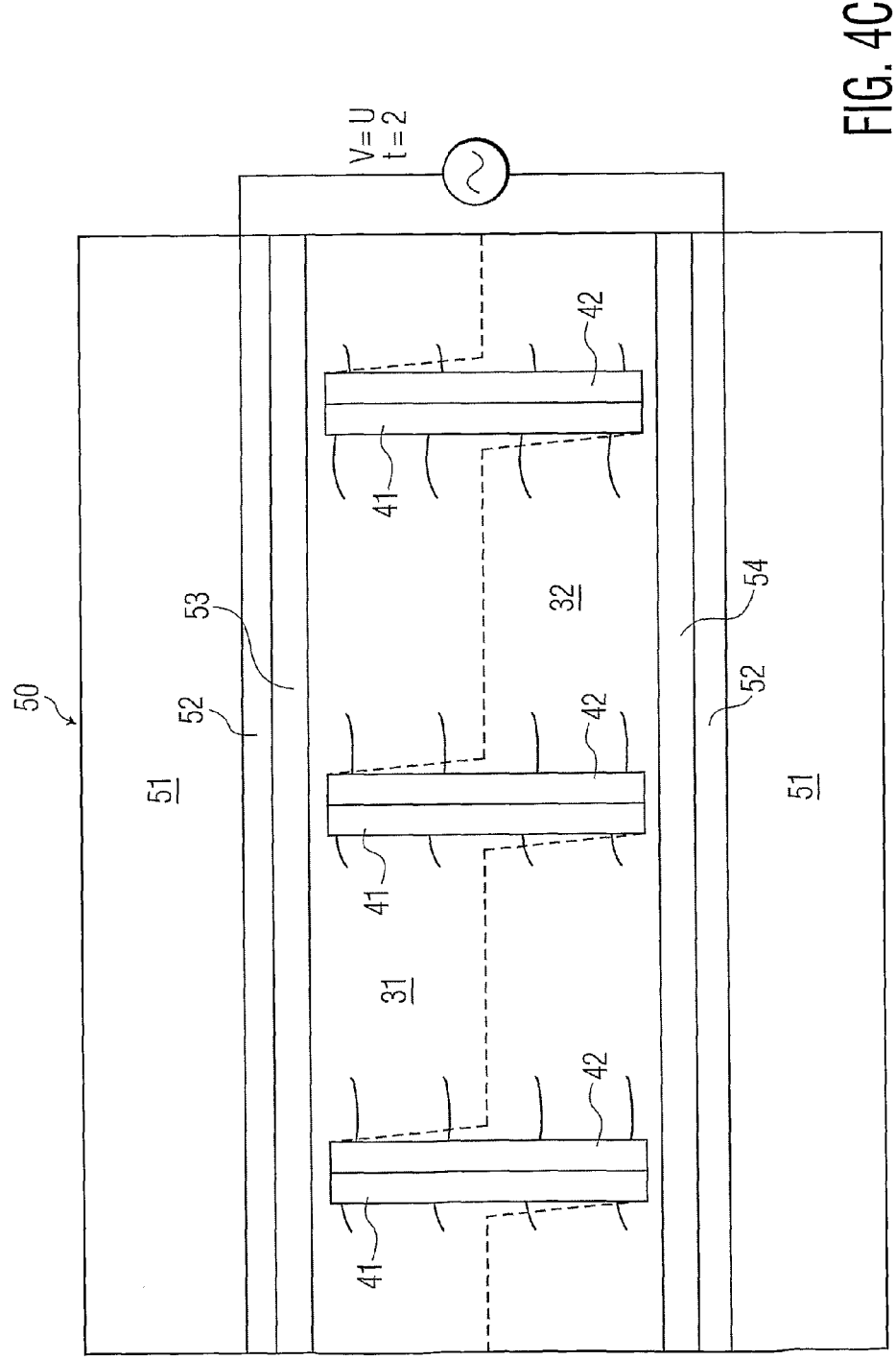

FIGS. 4A-4C illustrate an optical device 50 having a cell defined by a pair of glass substrates 51, a pair of electrodes 52 (i.e., transparent conducting layers such as indium tin oxide ITO), a hydrophilic layer 53 and a hydrophobic layer 54. Within the cell, fluid host medium 30 (FIG. 2A) includes polar liquid 31 interfacing with a hydrophilic layer 53, and apolar liquid 32 interfacing with a hydrophobic layer 54. An interfacing of polar liquid 31 and apolar liquid 32 is shown as a dashed line to facilitate an unambiguous illustration of the interface. Suspended within fluid host medium 30 are three (3) flakes 40 (FIG. 3A), each having hydrophilic layer 44 interfacing with polar liquid 31, and hydrophobic layer 45 interfacing with apolar liquid 32. Core 43 is not shown for purposes of highlighting the suspension of flakes 40 based on layers 44 and 45.

In the absence of an electric field being applied to the cell as illustrated in FIG. 4A, flakes 40 are parallel to layers 51-54 whereby optical device 50 is operating in an optical state suitable for primarily reflecting, absorbing, or fluorescing light as a function of a surface treatment of flakes 40. When a vertically extending electric field U is subsequently applied to the cell as illustrated in FIGS. 4B and 4C, flakes 40 rapidly transition from being parallel to layers 51-54 to being uniaxially aligned within fluid host medium in the vertical direction of applied electric field U whereby optical device 50 is operating in an optical state suitable for primarily transmitting light. Upon a ceasing of the application of electric field U to the cell, flakes 40 can rapidly transition from being uniaxially aligned within fluid host medium in the vertical direction of applied electric field U to again being parallel to layers 51-54 whereby optical device 50 is again operating in a light reflecting/absorbing/fluorescing state.

Figure 5:
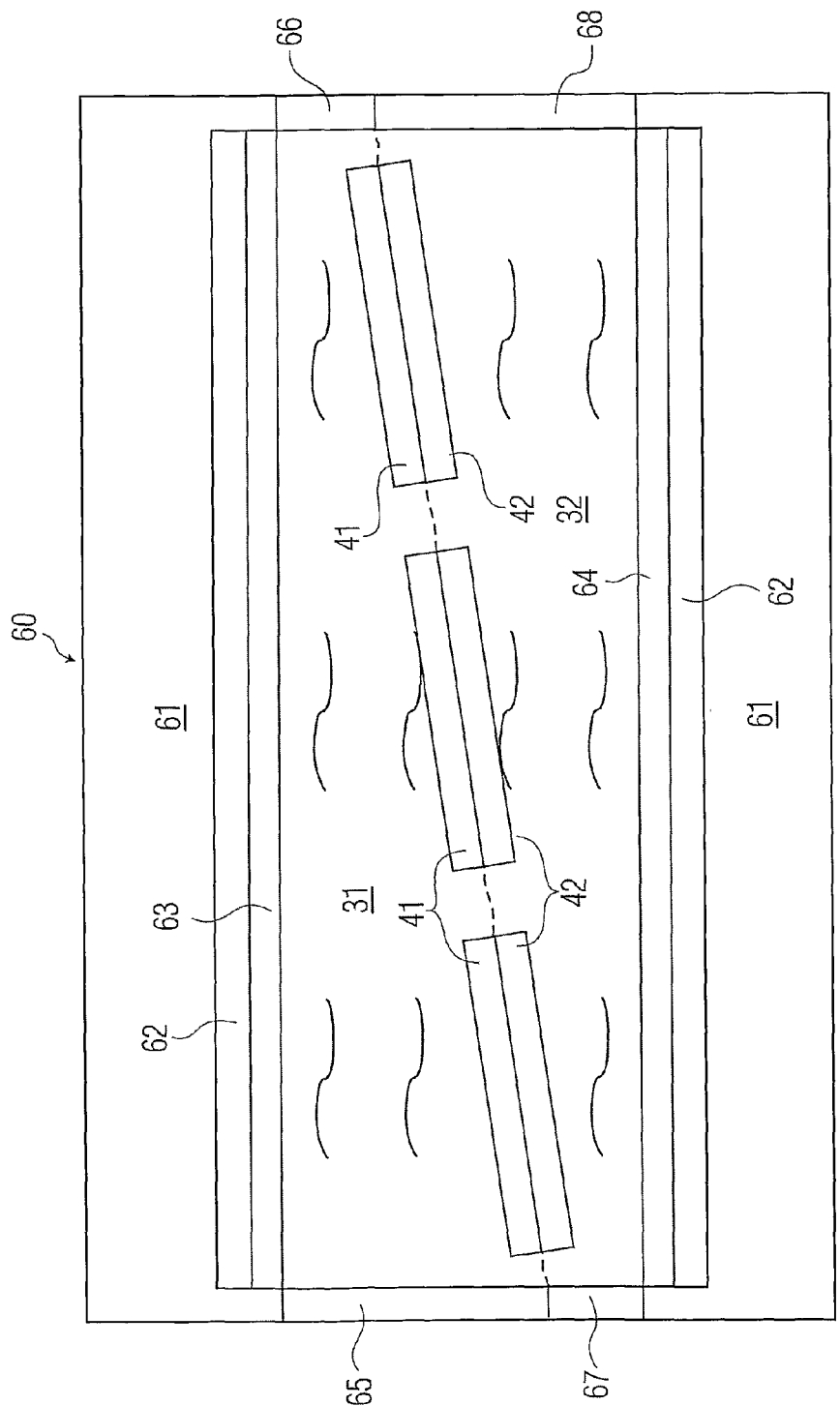
FIG. 5 illustrates a second embodiment of an optical device in accordance with the present invention.

FIG. 5 illustrates an optical device 60 having a cell defined by a pair of glass substrates 61, a pair of electrodes 62, an optional hydrophilic layer 63, an optional hydrophobic layer 64, hydrophilic layers 65 and 66, and a hydrophobic layers 67 and 68. Within the cell, fluid host medium 30 (FIG. 2A) includes polar liquid 31 interfacing with hydrophilic layers 63, 65 and 66, and apolar liquid 32 interfacing with hydrophobic layers 64, 67 and 68. An interfacing of polar liquid 31 and apolar liquid 32 is shown as a dashed line to facilitate an unambiguous illustration of the interface. Suspended within fluid host medium 30 are three (3) flakes 40 (FIG. 3A), each having hydrophilic layer 41 interfacing with polar liquid 31 and hydrophobic layer 42 interfacing with apolar liquid 32. Core 43 is not shown for purposes of highlighting the suspension of flakes 40 based on layers 44 and 45.

Optical device 60 is shown in an optical state suitable for primarily reflecting, absorbing, or fluorescing light as a function of a surface treatment of flakes 40 whereby device 60 can be rapidly switched to an optical state suitable for primarily transmitting light with an application of an electric field between electrodes 62. Those having ordinary skill in the art will appreciate that flakes 40 are tilted at an angle with respect to the cell surfaces in the absence of an electric field between electrodes 62 to facilitate an orientation of the long axes of flakes 40 in the direction of an electric field upon an application of the electric field between electrodes 62.

Figure 6:
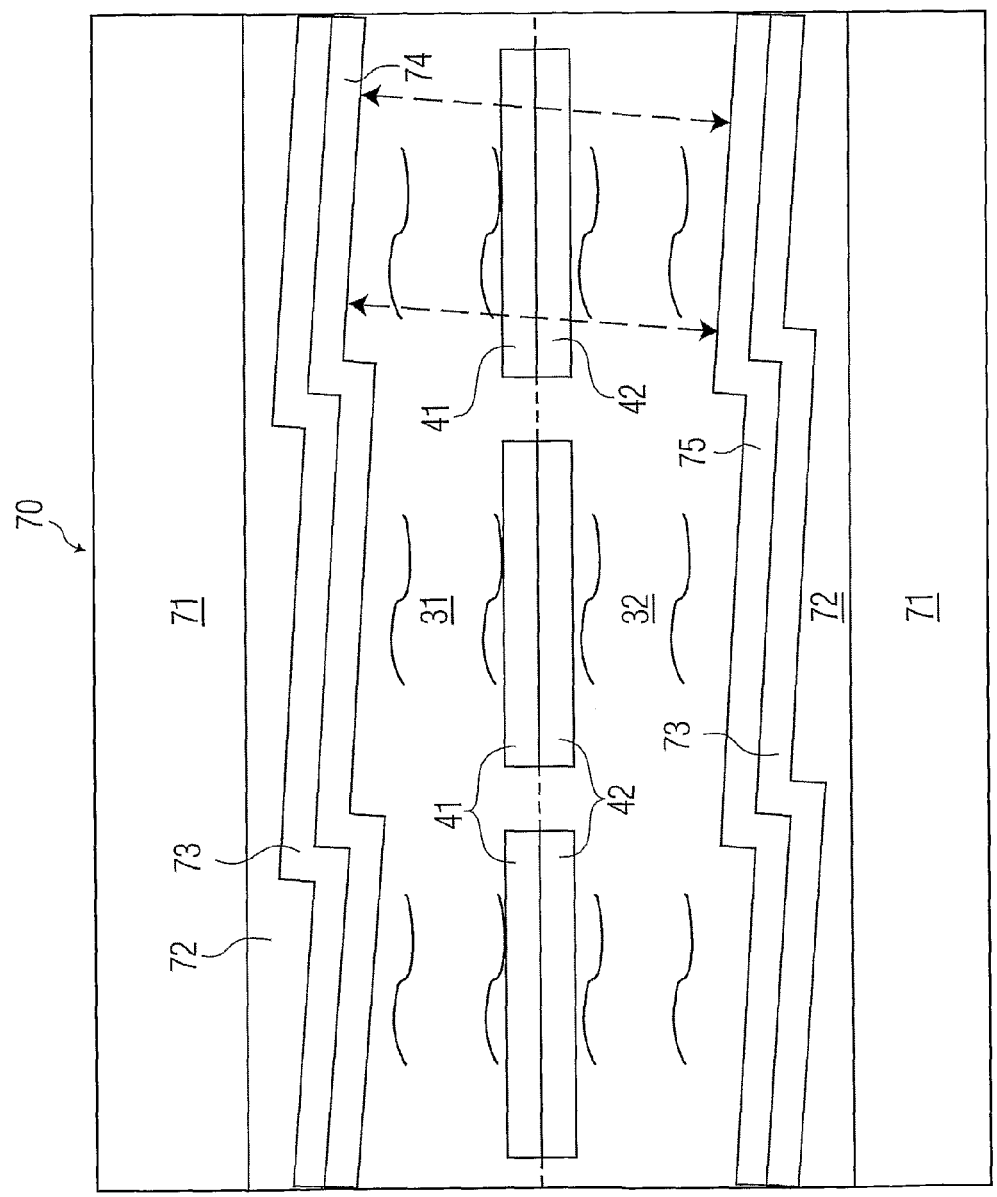
FIG. 6 illustrates a third embodiment of an optical device in accordance with the present invention.

FIG. 6 illustrates an optical device 70 having a cell defined by a pair of glass substrates 71, a pair of transparent structures 72, a pair of electrodes 73, a hydrophilic layer 74 and a hydrophobic layer 75. Within the cell, fluid host medium 30 (FIG. 2A) includes polar liquid 31 interfacing with hydrophilic layer 74, and apolar liquid 32 interfacing with hydrophobic layer 75. An interfacing of polar liquid 31 and apolar liquid 32 is shown as a dashed line to facilitate an unambiguous illustration of the interface. Suspended within fluid host medium 30 are three (3) flakes 40 (FIG. 3A), each having hydrophilic layer 41 interfacing with polar liquid 31 and hydrophobic layer 42 interfacing with apolar liquid 32. Core 43 is not shown for purposes of highlighting the suspension of flakes 40 based on layers 44 and 45.

Optical device 70 is shown in an optical state suitable for primarily reflecting, absorbing, or fluorescing light as a function of a surface treatment of flakes 40 whereby device 70 can be rapidly switched to an optical state suitable for primarily transmitting light with an application of an electric field between electrodes 73, which have a right triangle configuration to direct the electric field in a direction titled with respect to a vertical direction of the cell as shown by the bi-directional dashed arrows. Those having ordinary skill in the art will appreciate that the right triangle configuration of electrodes 73 to facilitate an orientation of the long axes of flakes 40 in the direction of an electric field upon an application of the electric field between electrodes 73.

Figure 7A:
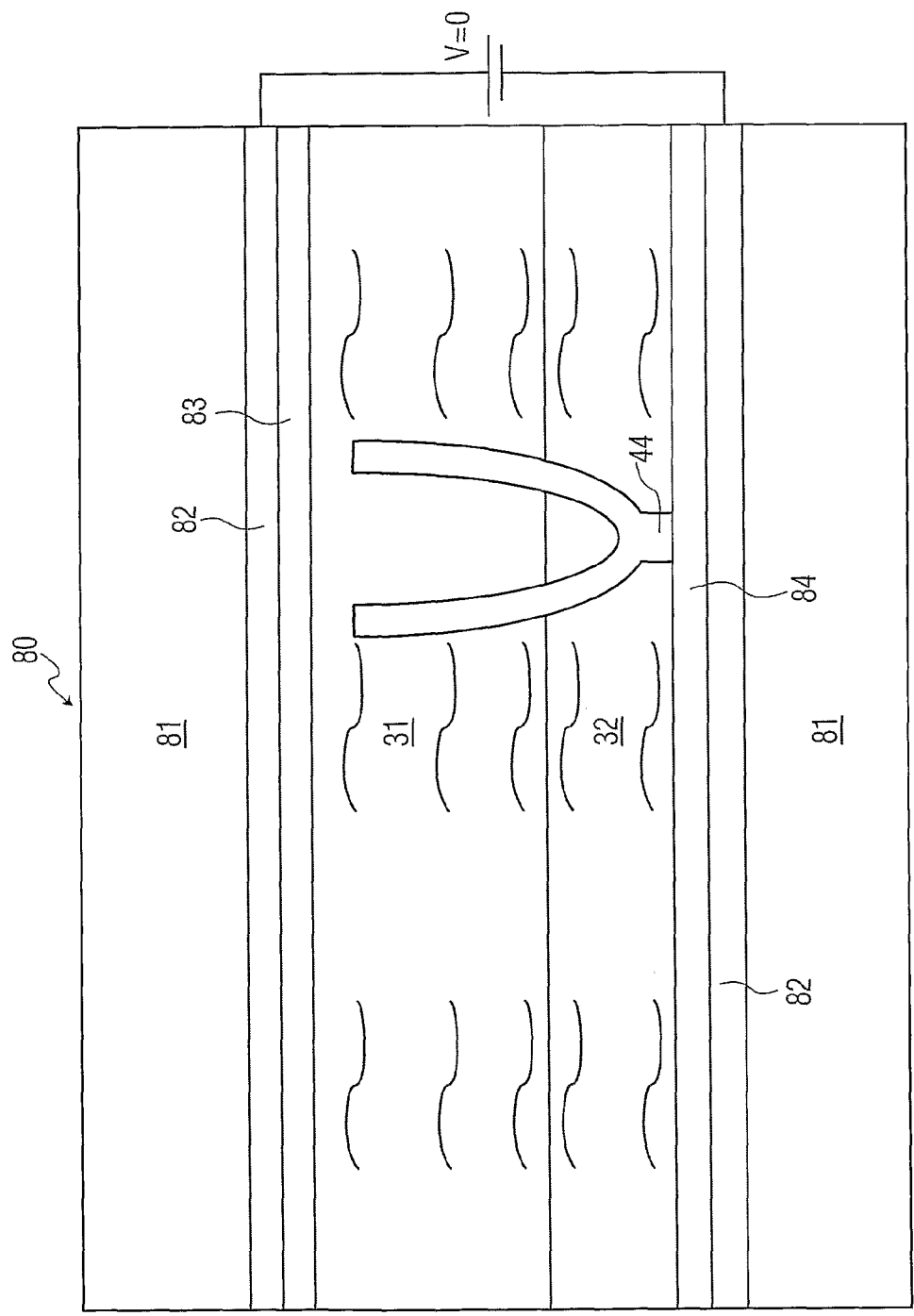
FIGS. 7A and 7B illustrate a fourth embodiment of an optical device in accordance with the present invention.
Figure 7B:
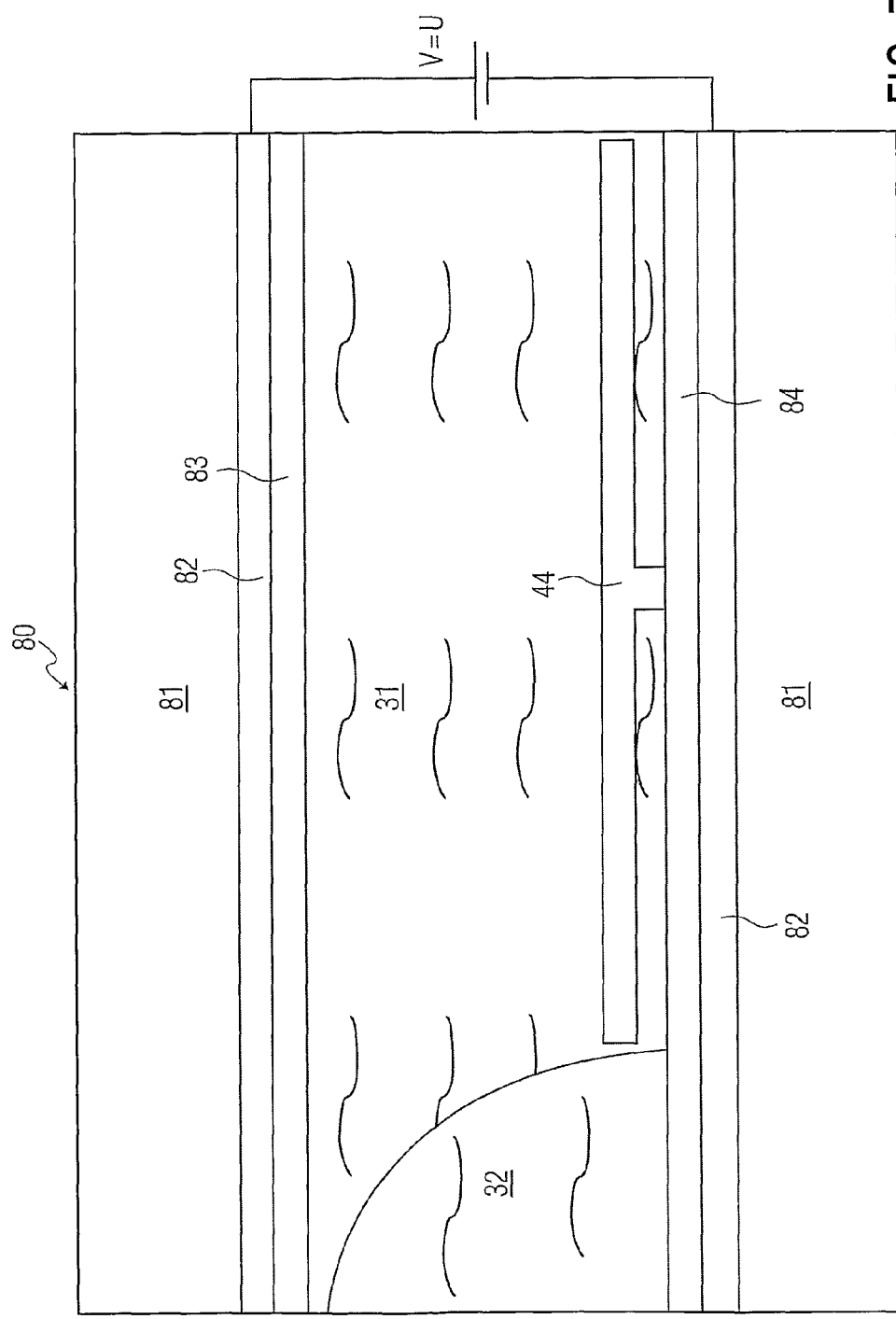

FIGS. 7A and 7B illustrate an optical device 80 having a cell defined by a pair of glass substrates 81, a pair of electrodes 82, a hydrophilic layer 83 and a hydrophobic layer 84. Within the cell, fluid host medium 30 (FIG. 2A) includes apolar liquid 32 underneath a polar liquid 31. Also disposed within fluid host medium 30 is a flake 41 (FIG. 3B) having a hydrophilic surface 44 partially bound to the cell.

In the absence of a potential being applied to bottom electrode 82 as illustrated in FIG. 7A, flake 41 maintains a U-configuration whereby optical device 80 is switched to an optical state suitable for primarily transmitting light. When a potential V is subsequently applied to bottom electrode 82 as illustrated in FIG. 7B, polar liquid 31 spreads over hydrophobic layer 84 pushing apolar liquid 32 aside whereby flake 41 can rapidly transition from the U-configuration to a T-configuration. The result is device 80 operating in an optical state suitable for primarily reflecting, absorbing, or fluorescing light as a function of a surface treatment of surface 44. Upon a ceasing of the application of potential V to bottom electrode 82, apolar liquid 32 reforms a layer whereby flake 41 can rapidly transition from the T-configuration to a U-configuration. The result is a switching of optical device 80 from the light reflecting/absorbing/fluorescing state back to the light transmitting state.

Figure 8A:
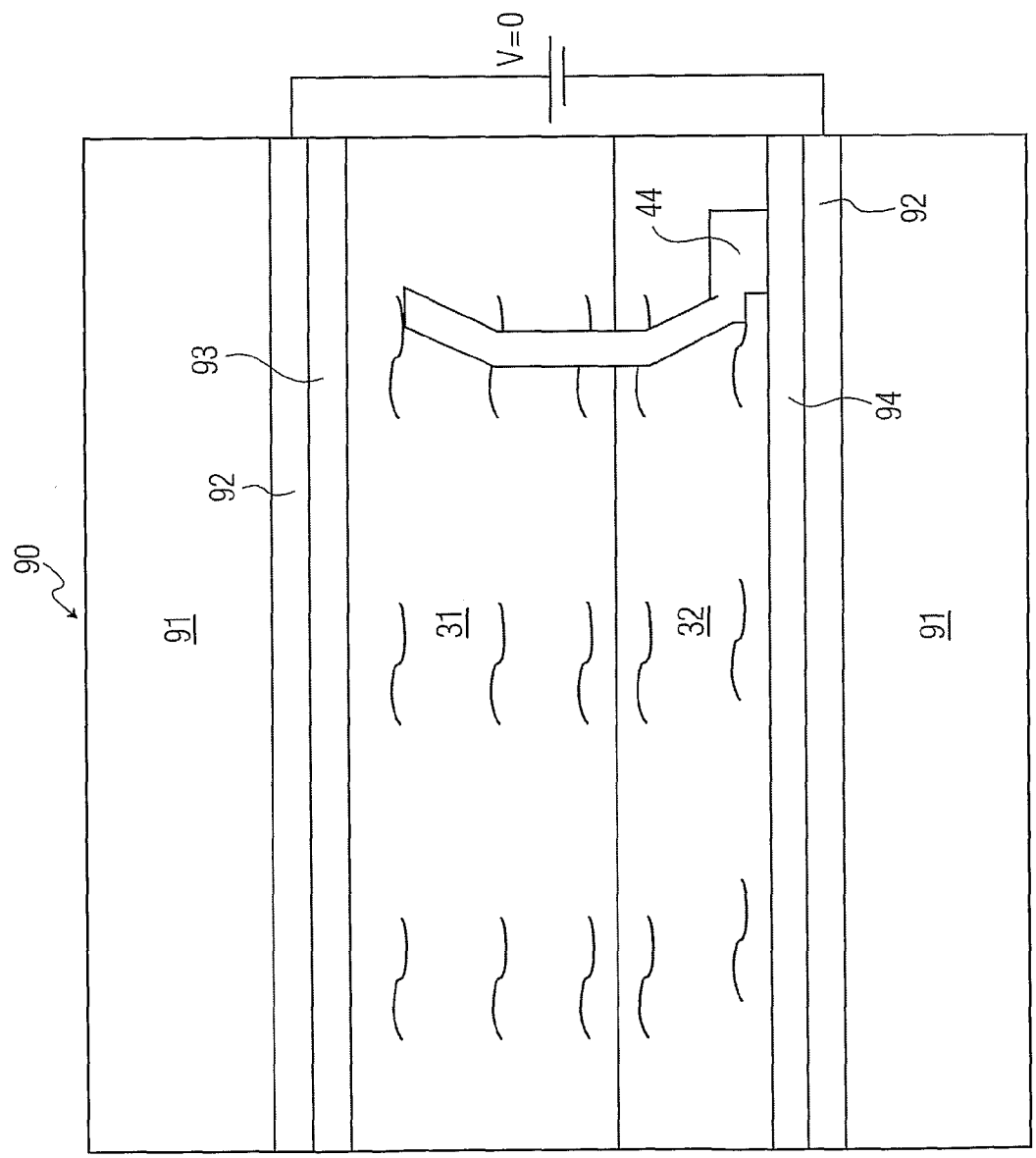

FIGS. 8A and 8B illustrate an optical device 90 having a cell defined by a pair of glass substrates 91, a pair of electrodes 92, a hydrophilic layer 93, and a hydrophobic layer 94. Within the cell, fluid host medium 30 (FIG. 2A) includes apolar liquid 32 underneath a polar liquid 31. Also disposed within fluid host medium 30 is a flake 41 (FIG. 3B) having hydrophilic surface 41 partially bound to the cell.

In the absence of a potential being applied to bottom electrode 92 as illustrated in FIG. 8A, an arm of flake 41 vertically extends within fluid host medium 30 whereby optical device 90 is operating in an optical state suitable for primarily transmitting light. When a potential V is subsequently applied to bottom electrode 92 as illustrated in FIG. 8B, polar liquid 31 spreads over hydrophobic layer 94 pushing apolar liquid 32 aside whereby the arm of flake 41 can rapidly transition from vertically extending within fluid host medium 30 to horizontally extending within polar liquid 31. The result is device 90 operating in an optical state suitable for primarily reflecting, absorbing, or fluorescing light as a function of a surface treatment of surface 44. Upon a ceasing of the application of potential V to bottom electrode 92, apolar liquid 32 reforms as a layer whereby flake 41 can rapidly transition from horizontally extending within polar liquid 31 to vertically extending within fluid host medium 30. The result is a switching of optical device 90 from light reflecting/absorbing/fluorescing state back to the light transmitting state.

Figure 9A:
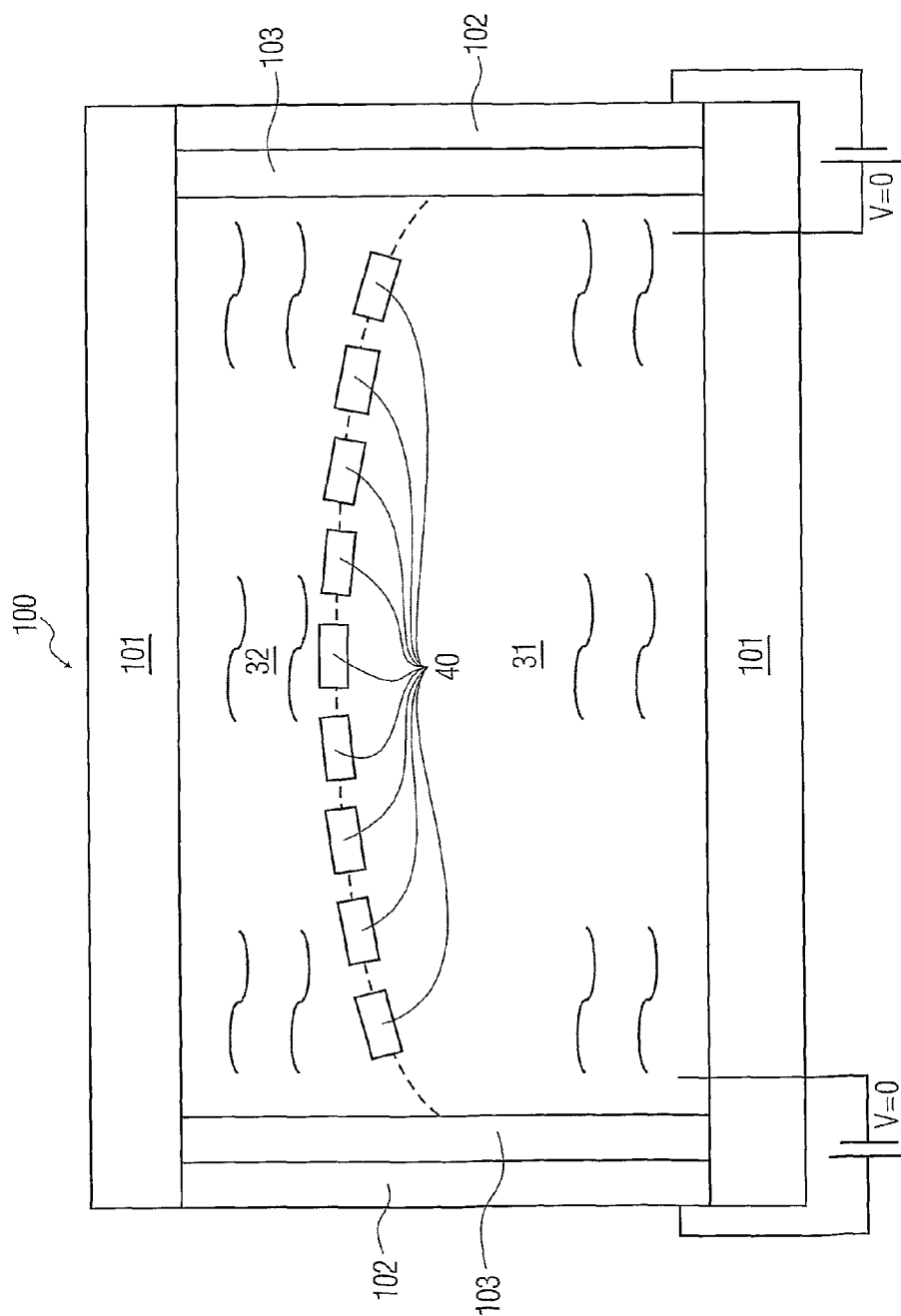
FIGS. 9A and 9B illustrate a sixth embodiment of an optical device in accordance with the present invention.
Figure 9B:
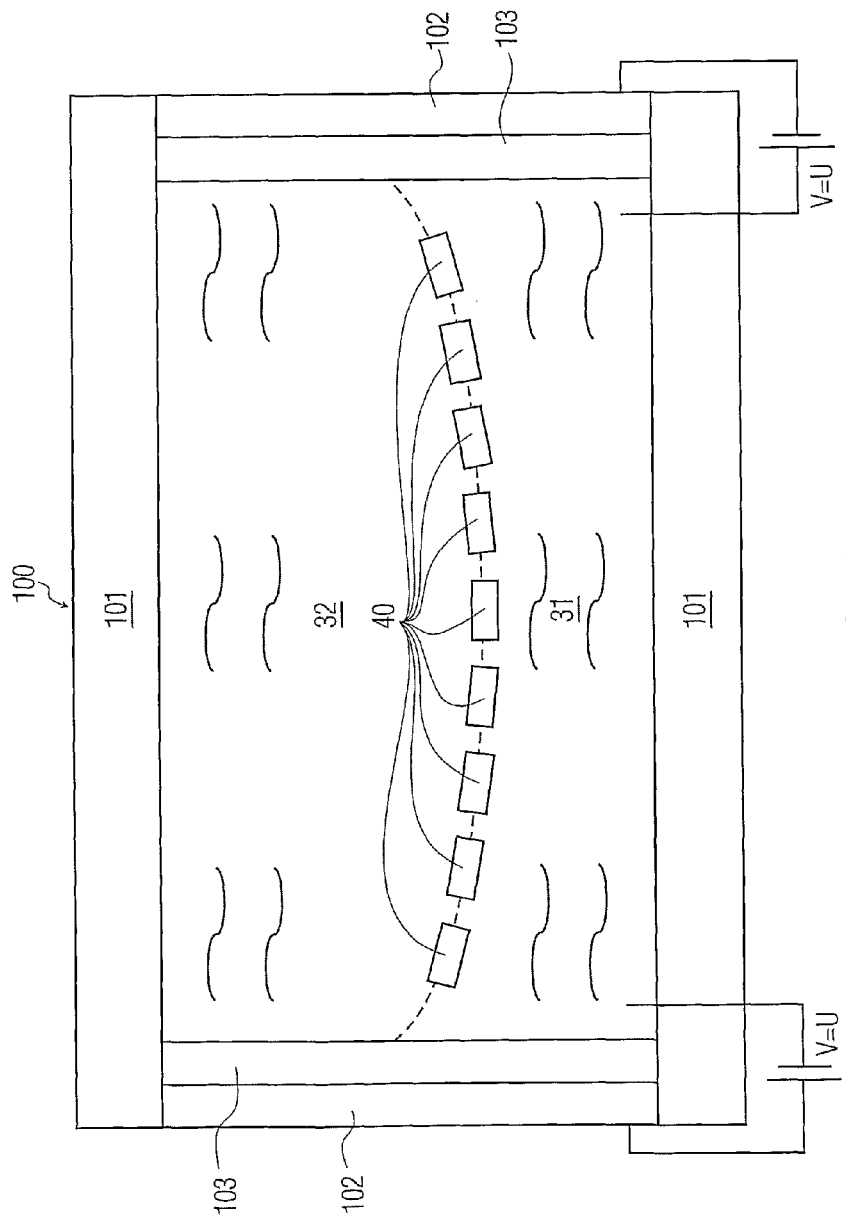

FIGS. 9A and 9B illustrate an optical device 100 having a cell defined by a pair of glass substrates 101, a pair of electrodes 102, and a pair of hydrophobic layers 103. Within the cell, fluid host medium 30 (FIG. 2A) includes polar liquid 31 interfacing with bottom substrate 101 and hydrophobic layers 103, and apolar liquid 32 interfacing with top substrate 101 and hydrophobic layers 103. An interfacing of polar liquid 31 and apolar liquid 32 is shown as a dashed line to facilitate an unambiguous illustration of the interface. Suspended within fluid host medium 30 are nine (9) flakes 40 (FIG. 3A), each having hydrophilic layer 41 (not shown) interfacing with polar liquid 31 and hydrophobic layer 42 (not shown) interfacing with apolar liquid 32. As illustrated in FIG. 9A, optical device 100 is shown in an optical state suitable for primarily reflecting light as a concave mirror. As illustrated in FIG. 9B, optical device 100 is shown in an optical state suitable for primarily reflecting light as a convex mirror. As such, optical device 10 can be selectively operated as a concave reflective mirror or a convex reflective mirror based on selective applications of voltages to electrodes 102 as illustrated in FIGS. 9A and 9B.

FIGS. 10A and 10B illustrate an optical device 110 having a cell defined by a pair of glass substrates 111, a pair of electrodes 112, a hydrophobic layer 114 and a hydrophilic layer 113. Within the cell, fluid host medium 30 (FIG. 2B) includes polar liquid 31 and apolar liquid 32. Suspended within fluid host medium 30 are seven (7) flakes 40 (FIG. 3A), each having hydrophilic layer 41 (not shown) interfacing with polar liquid 31 and hydrophobic layer 42 (not shown) interfacing with apolar liquid 32.

In the absence of a potential being applied to the electrodes 112 as illustrated in FIG. 10A, apolar liquid 32 spreads over hydrophobic layer 114 whereby flakes 40 are spread over the interface of polar liquid 31 and apolar liquid 32. The result is a switching of optical device 110 to an optical state suitable for primarily reflecting, absorbing or fluorescing light as a function of a surface treatment of flakes 40. When a potential V is applied to the electrodes 112 as illustrated in FIG. 10B, flakes 40 encircle a droplet of apolar liquid 32 whereby optical device 110 operates in an optical state suitable for primarily transmitting light. Upon a ceasing of the application of potential V to electrodes 112, apolar liquid 32 again spreads over hydrophobic layer 113 whereby flakes 40 are spread over the interface of polar liquid 31 and apolar liquid 32. The result is a switching of optical device 110 from the transmitting state back to the reflecting/absorbing/fluorescing state.

FIGS. 11A-11D illustrate an optical device 120 having a cell defined by a pair of glass substrates 121, three (3) electrodes 122, 123 and 124 and a pair of hydrophobic layers 125. Within the cell, fluid host medium 30 (FIG. 2A) includes polar liquid 31 and apolar liquid 32. Disposed within fluid host medium 33 is an electrode 124. Suspended within fluid host medium 30 are a plurality of flakes 40 (FIG. 3A), each having hydrophilic layer 41 (not shown) interfacing with polar liquid 31 and hydrophobic layer 42 (not shown) interfacing with apolar liquid 32.

Figure 1A:
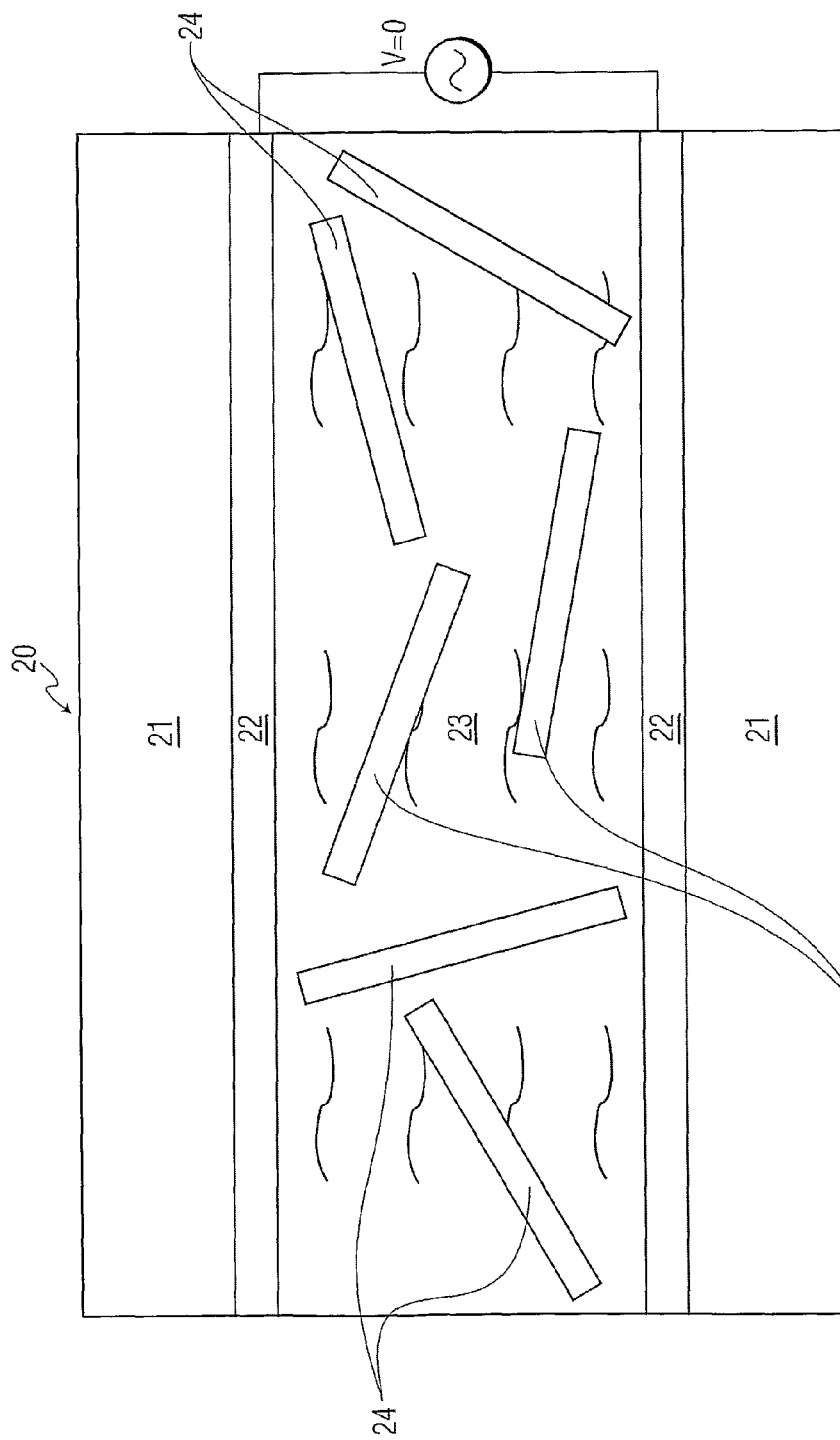
FIGS. 1A and 1B illustrate an optical device employing electro-optically sensitive flakes as known in the art.
Figure 1B:
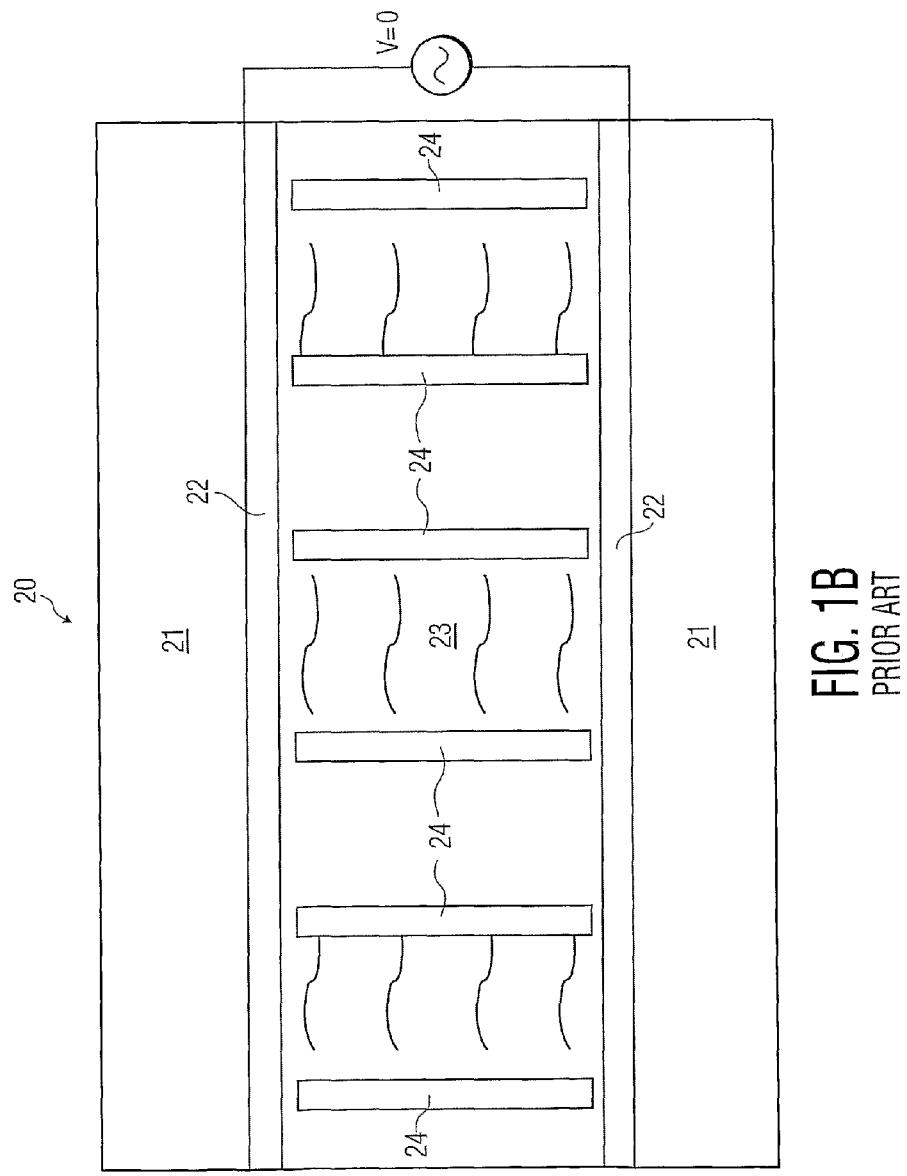
Figure 11A:
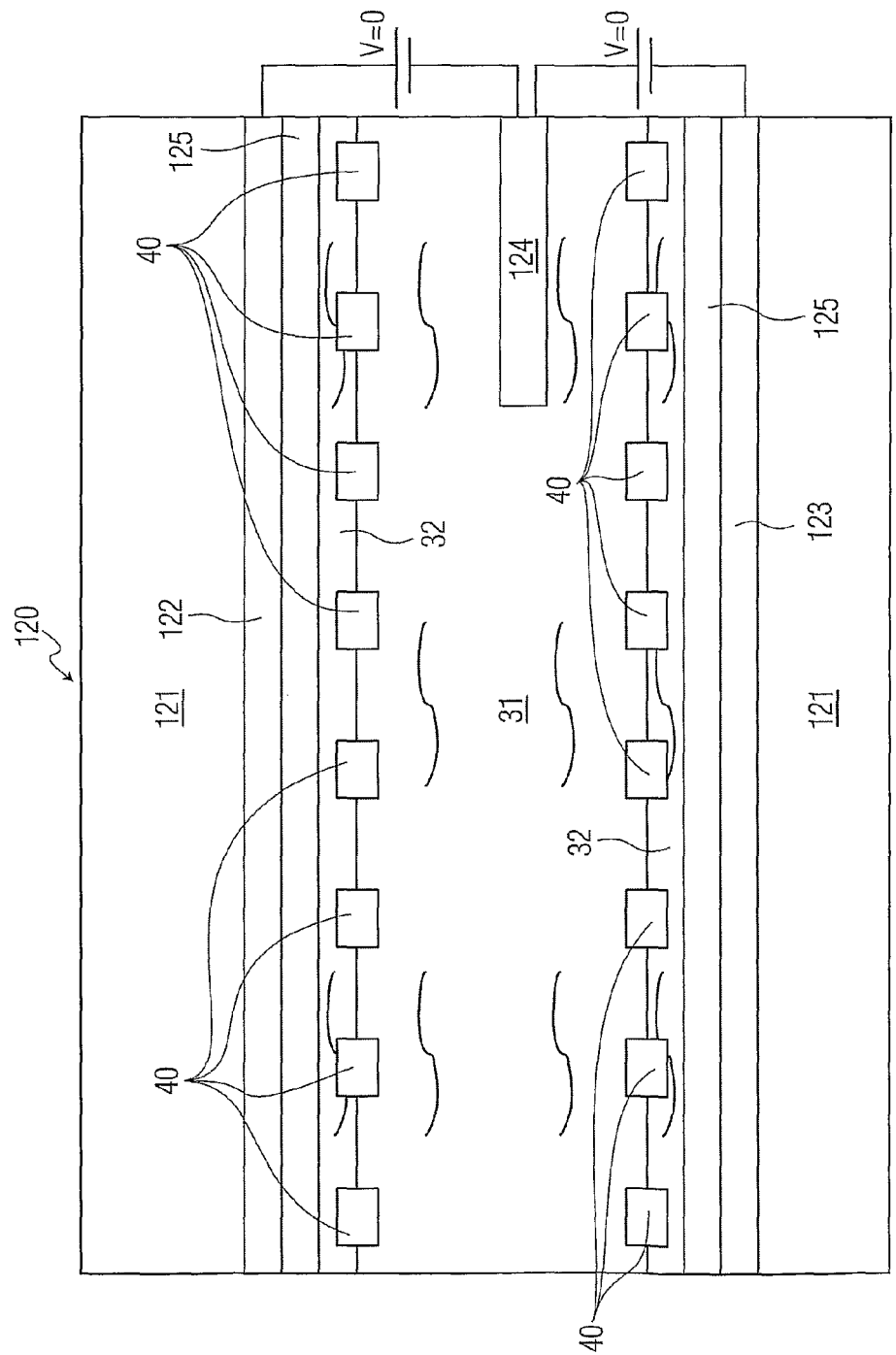
FIGS. 11A-11D illustrate an eight embodiment of an optical device in accordance with the present invention.
Figure 11B:
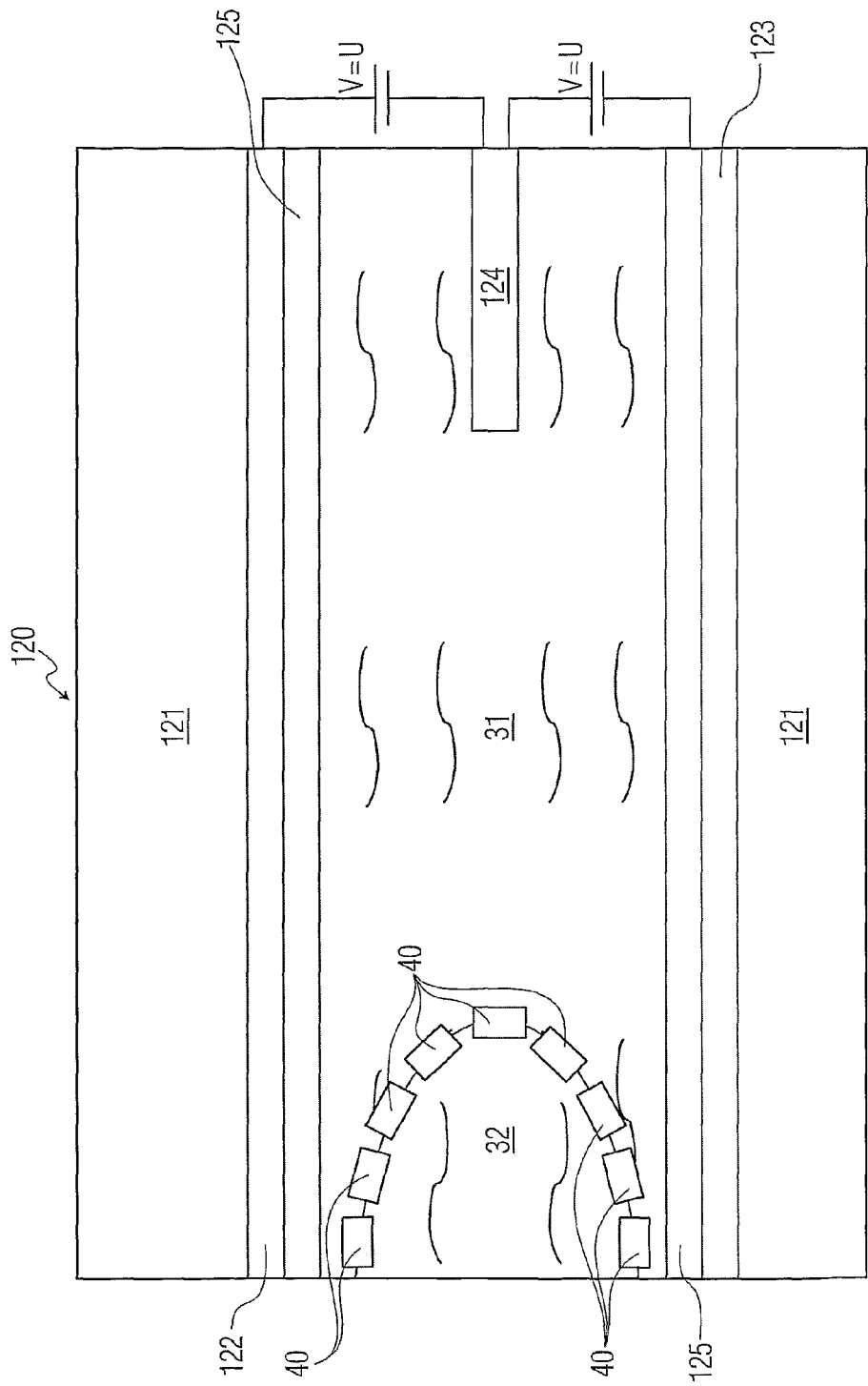

In the absence of a potential being applied between electrodes 122 and 124, and between electrodes 123 and 124 as illustrated in FIG. 11A, apolar liquid 32 spreads over hydrophobic layers 125 whereby flakes 40 are spread over the interface of polar liquid 31 and apolar liquid 32. The result is a switching of optical device 120 to an optical state suitable for primarily reflecting, absorbing or fluorescing light as a function of a surface treatment of flakes 40. When a potential V is applied between electrodes 122 and 124, and between electrodes 123 and 124 as illustrated in FIG. 1B, flakes 40 encircle a droplet of apolar liquid 32 whereby optical device 120 operates in an optical state suitable for primarily transmitting light.

Figure 11C:
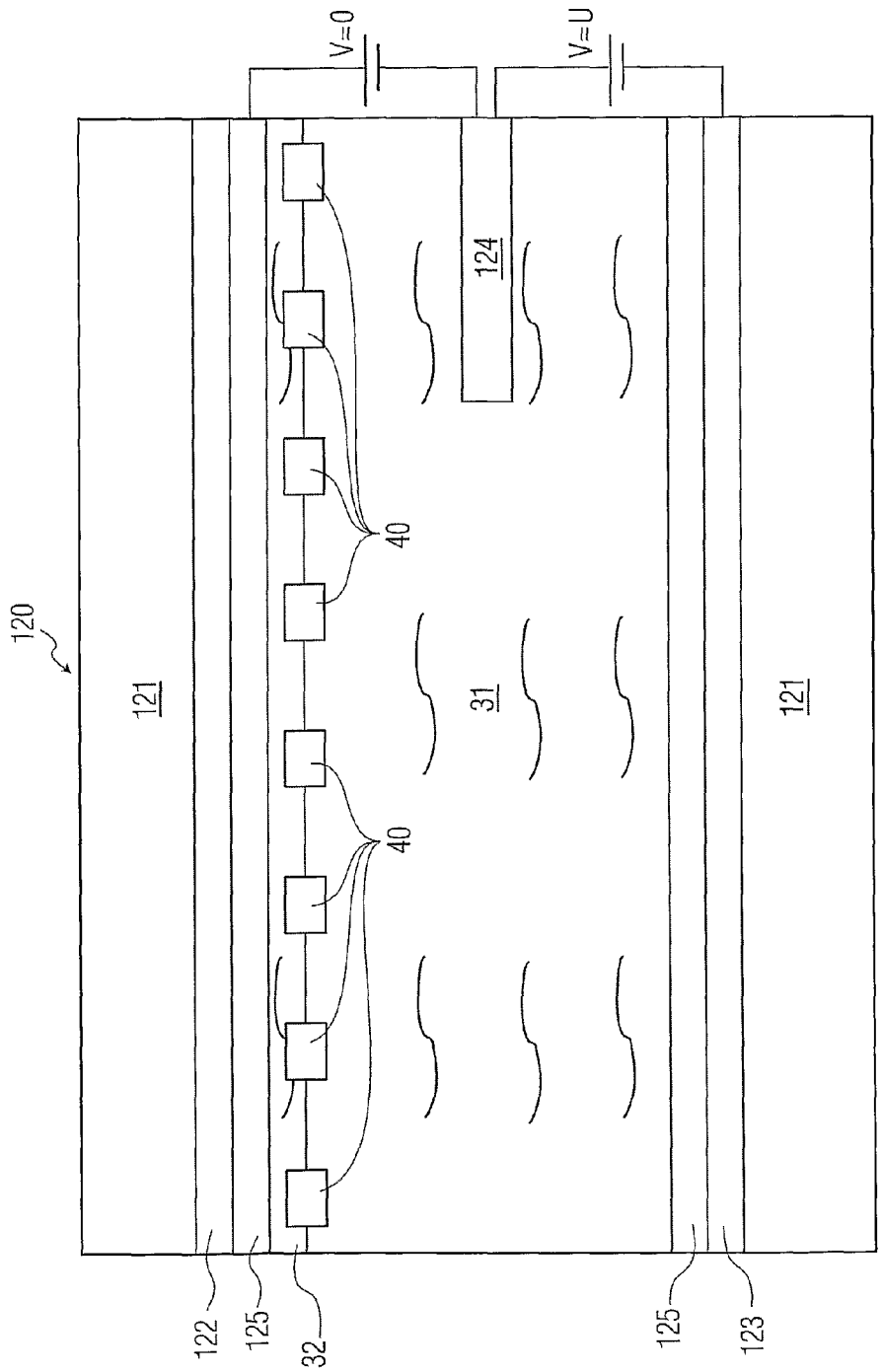
Figure 11D:
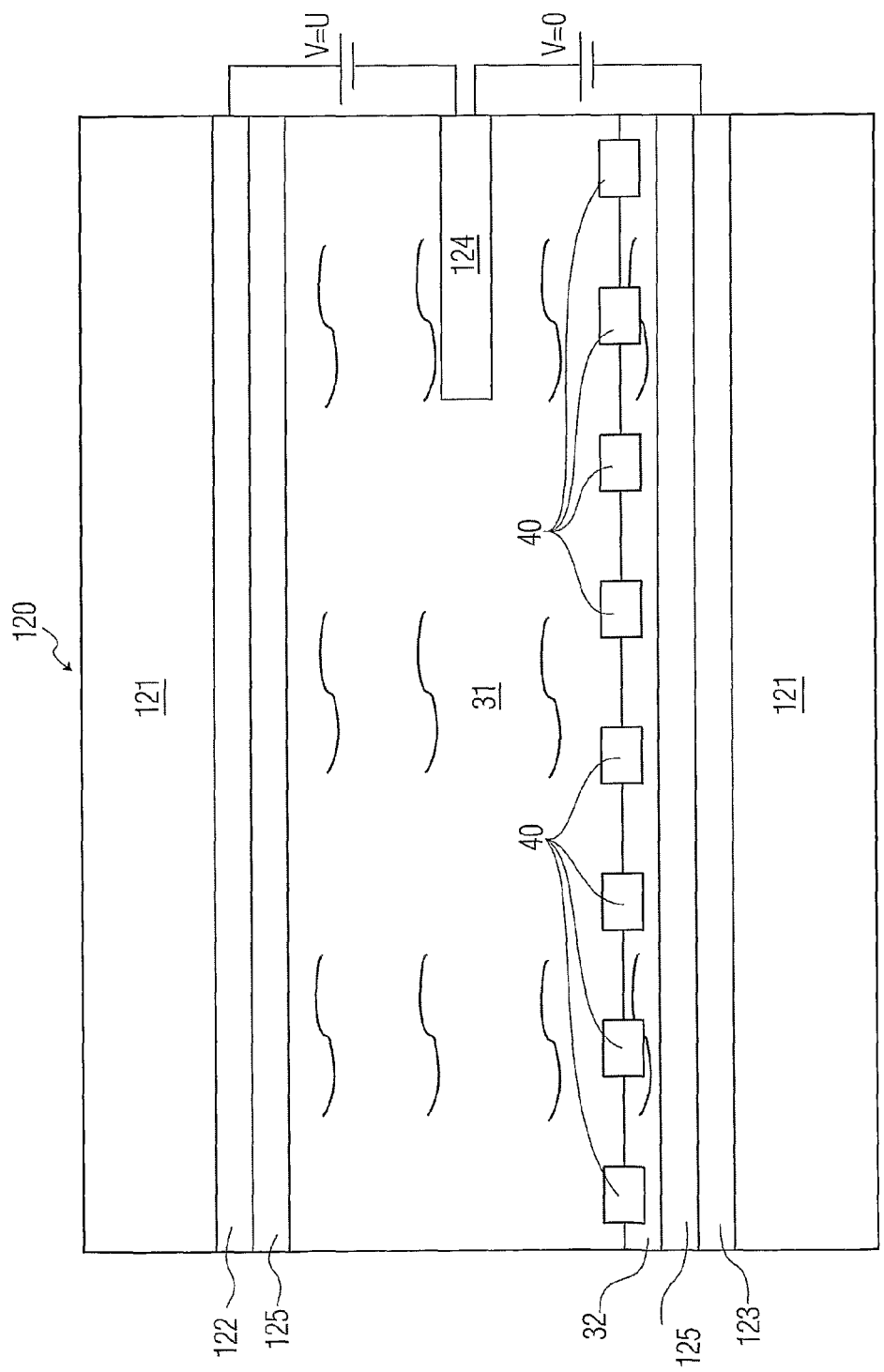

When potential V is exclusively applied between electrodes 123 and 124 as illustrated in FIG. 11C, apolar liquid 32 spreads overtop top hydrophobic layer 125 whereby flakes 40 are spread over the interface of polar liquid 31 and apolar liquid 32. The result is a switching of optical device 120 to an optical state suitable for primarily reflecting, absorbing or fluorescing light as a function of a surface treatment of flakes 40. When potential V exclusively applied between electrodes 122 and 124 as illustrated in FIG. 11D, apolar liquid 32 spreads over bottom hydrophobic layer 125 whereby flakes 40 are spread over the interface of polar liquid 31 and apolar liquid 32. The result is a switching of optical device 120 to an optical state suitable for primarily reflecting, absorbing or fluorescing light as a function of a surface treatment of flakes 40.

In one embodiment, hydrophilic layers 41 of flakes 40 is treated to specularly reflect light as seen from an observer looking down upon optical device 120, and hydrophobic layers 42 of flakes 40 is treated to diffusely reflect light as seen from an observer looking down upon optical device 120. Thus, optical device 120 operates as a diffusely reflective mirror when potential V is applied between electrodes 123 and 124 as illustrated in FIG. 11C, and as a specularly reflective mirror potential V is applied between electrode electrodes 122 and 124 as illustrated in FIG. 11D.

FIGS. 12A-12D illustrate an optical device 130 having a cell defined by a pair of glass substrates 131, four (4) electrodes 132-135, a pair of hydrophobic layers 136 and a reflective color filter 137 (e.g., green). Within the cell, fluid host medium 30 (FIG. 2A) includes polar liquid 31 and apolar liquid 32 with an interfacing of polar liquid 31 and apolar liquid 32 is shown as a dashed line to facilitate an unambiguous illustration of the interface. Disposed within fluid host medium 30 are a pair of electrodes 138 and 139. Suspended within fluid host medium 30 are flakes 40 (FIG. 3A), each having hydrophilic layer 41 interfacing with polar liquid 31, and hydrophobic layer 42 interfacing with apolar liquid 32. Furthermore, each hydrophilic layer 41 has been treated to reflect a color (e.g., blue) and each hydrophobic layer 42 to reflect a different color (e.g., red).

Figure 12A:
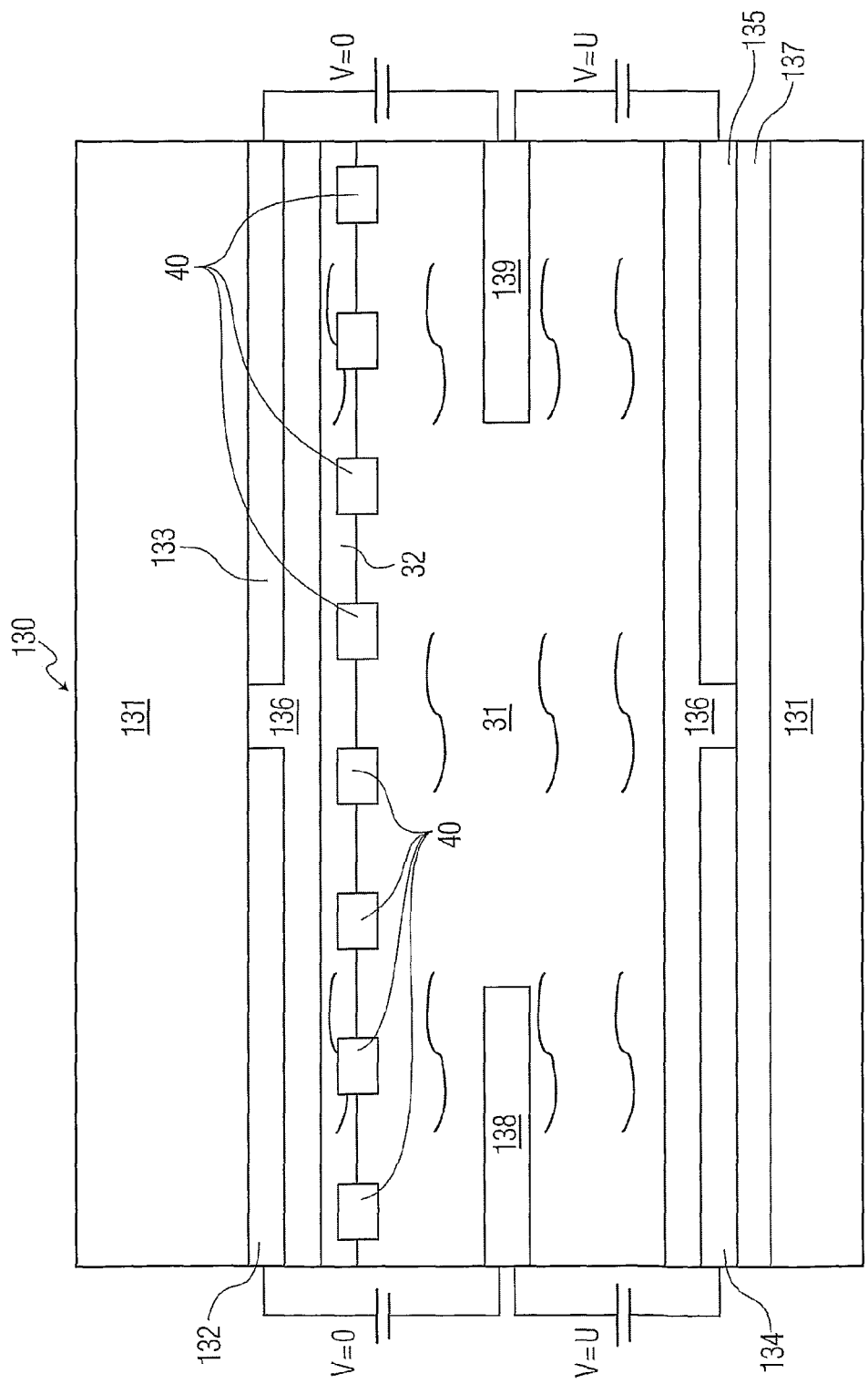
FIGS. 12A-12D illustrate a ninth embodiment of an optical device in accordance with the present invention.
Figure 12B:
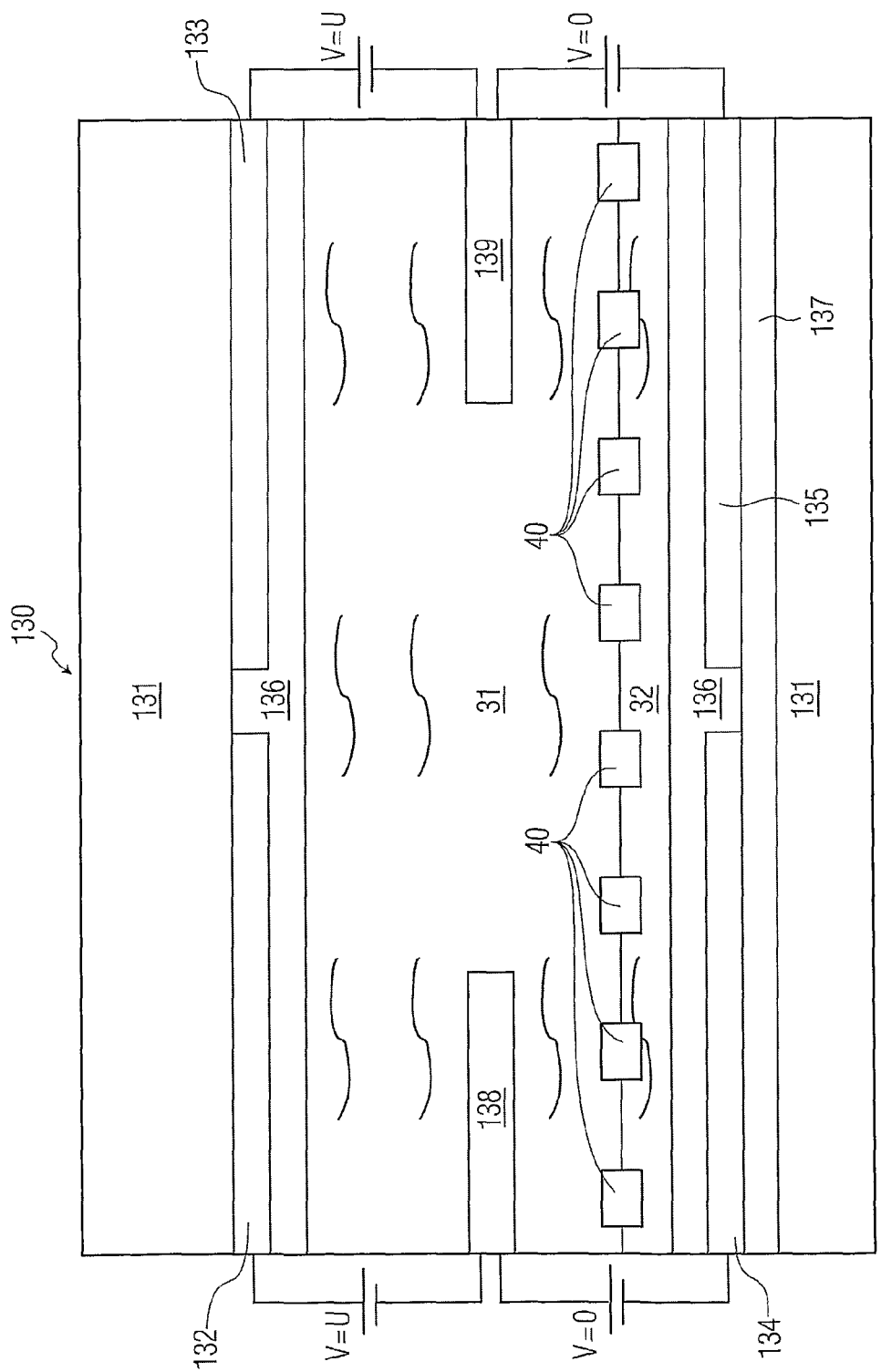

When a potential V is applied between electrodes 134 and 138, and between electrodes 135 and 139 as illustrated in FIG. 12A, apolar liquid 32 overlays top hydrophobic layer 136 where by blue light reflecting from flakes 40 can be seen from an observer above optical device 130. When potential V is applied between electrodes 132 and 138, and between electrodes 133 and 139 as illustrated in FIG. 12B, apolar liquid 32 overlays bottom hydrophobic layer 136 whereby red light reflecting from flakes 40 can be seen from an observer above optical device 130.

Figure 12C:
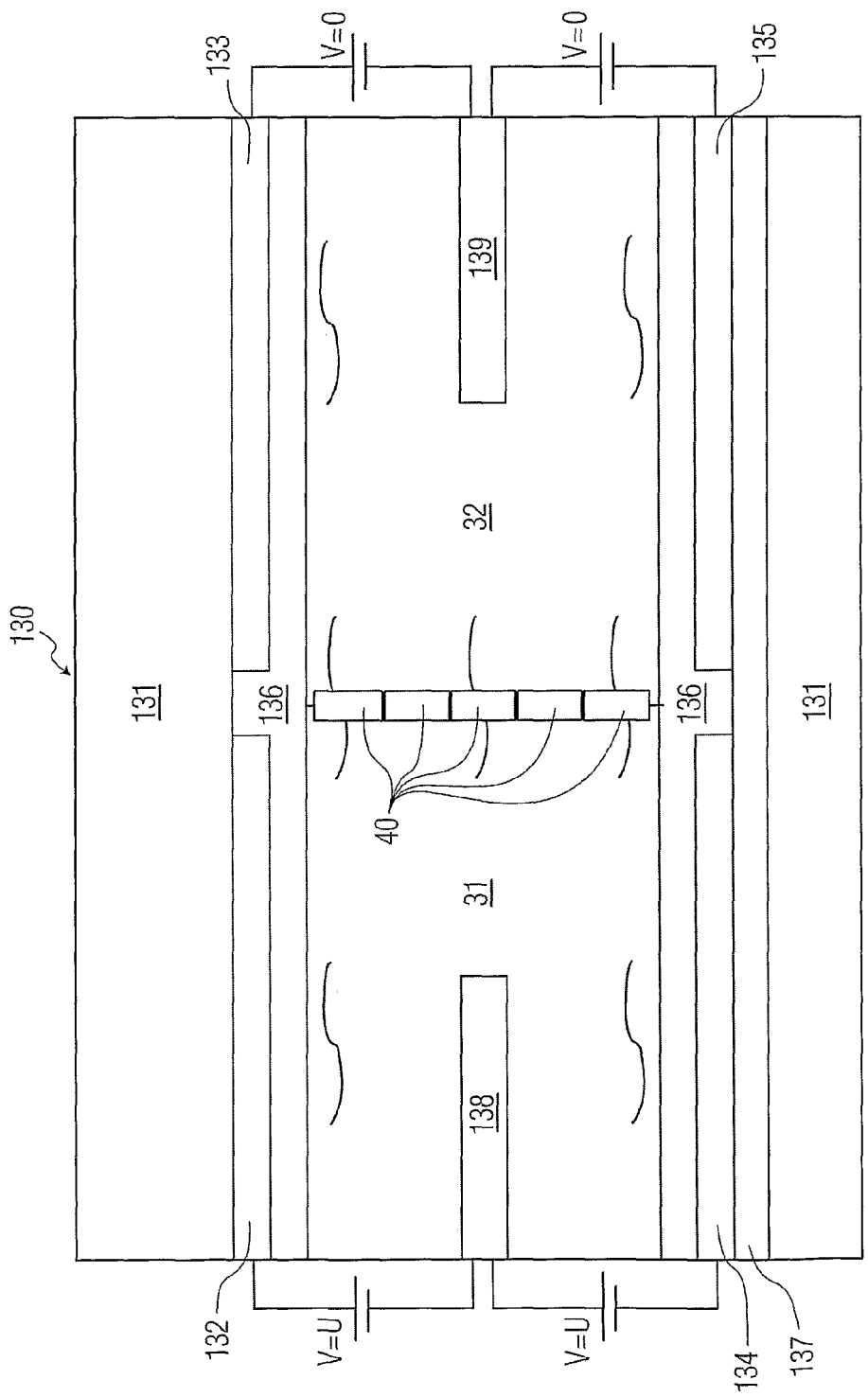
Figure 12D:
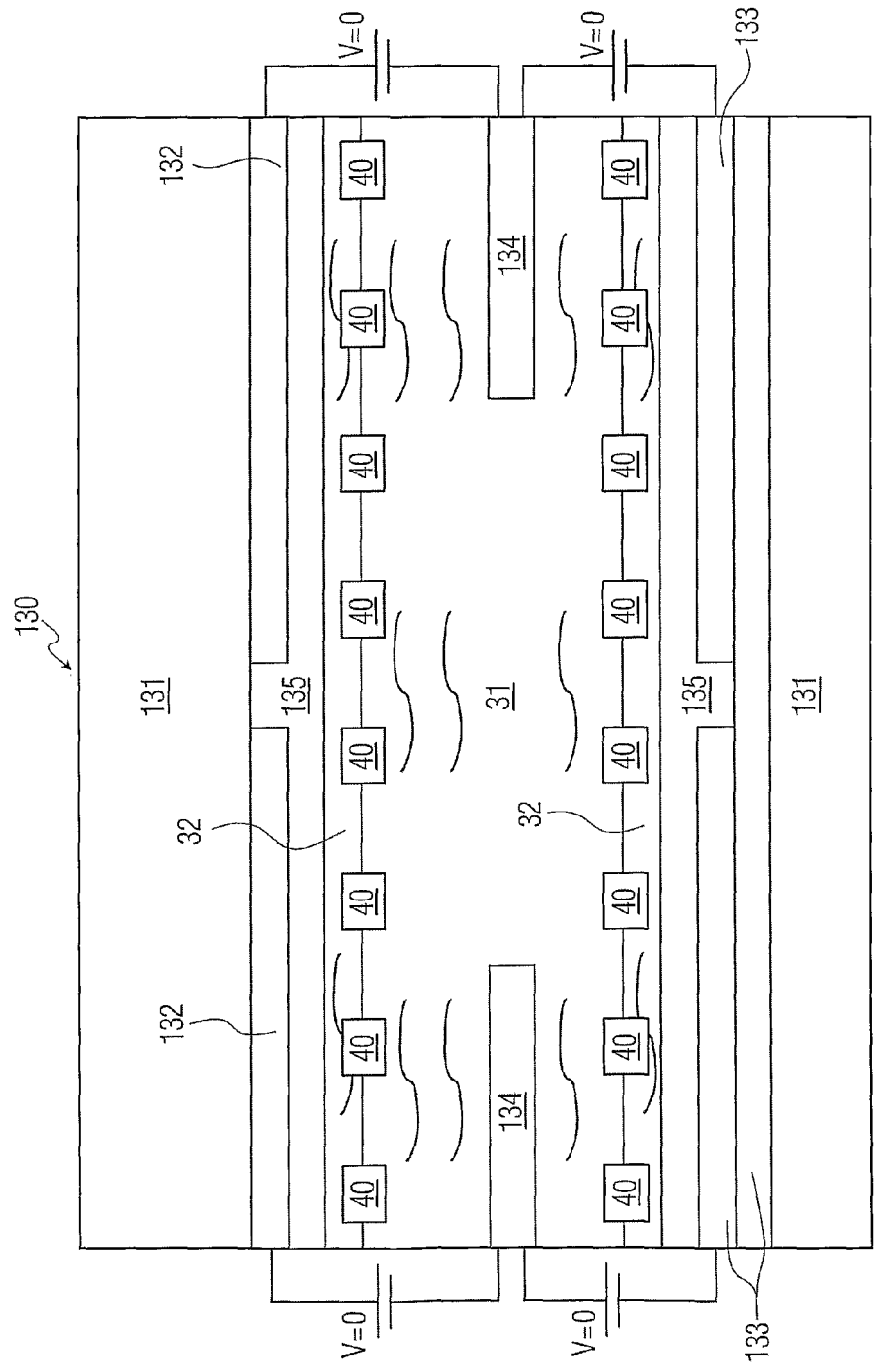

When potential V is applied between electrodes 132 and 138, and between electrodes 134 and 138 as illustrated in FIG. 12C, polar liquid 31 interfaces electrode 138 and hydrophobic layers 136, and apolar liquid 32 interfaces with electrode 139 and hydrophobic layers 136 whereby green light reflecting from reflective color filter 137 can be seen from an observer above optical device 130. In the absence of a potential being applied between electrodes 132-135, 138 and 139 as illustrated in FIG. 12D, apolar liquid 32 spreads over both hydrophobic layers 136 whereby flakes 40 are spread over the interface of polar liquid 31 and apolar liquid 3s on both sides. The result is a switching of optical device 130 to an optical state suitable for reflecting both blue light and red light.

Figure 13A:
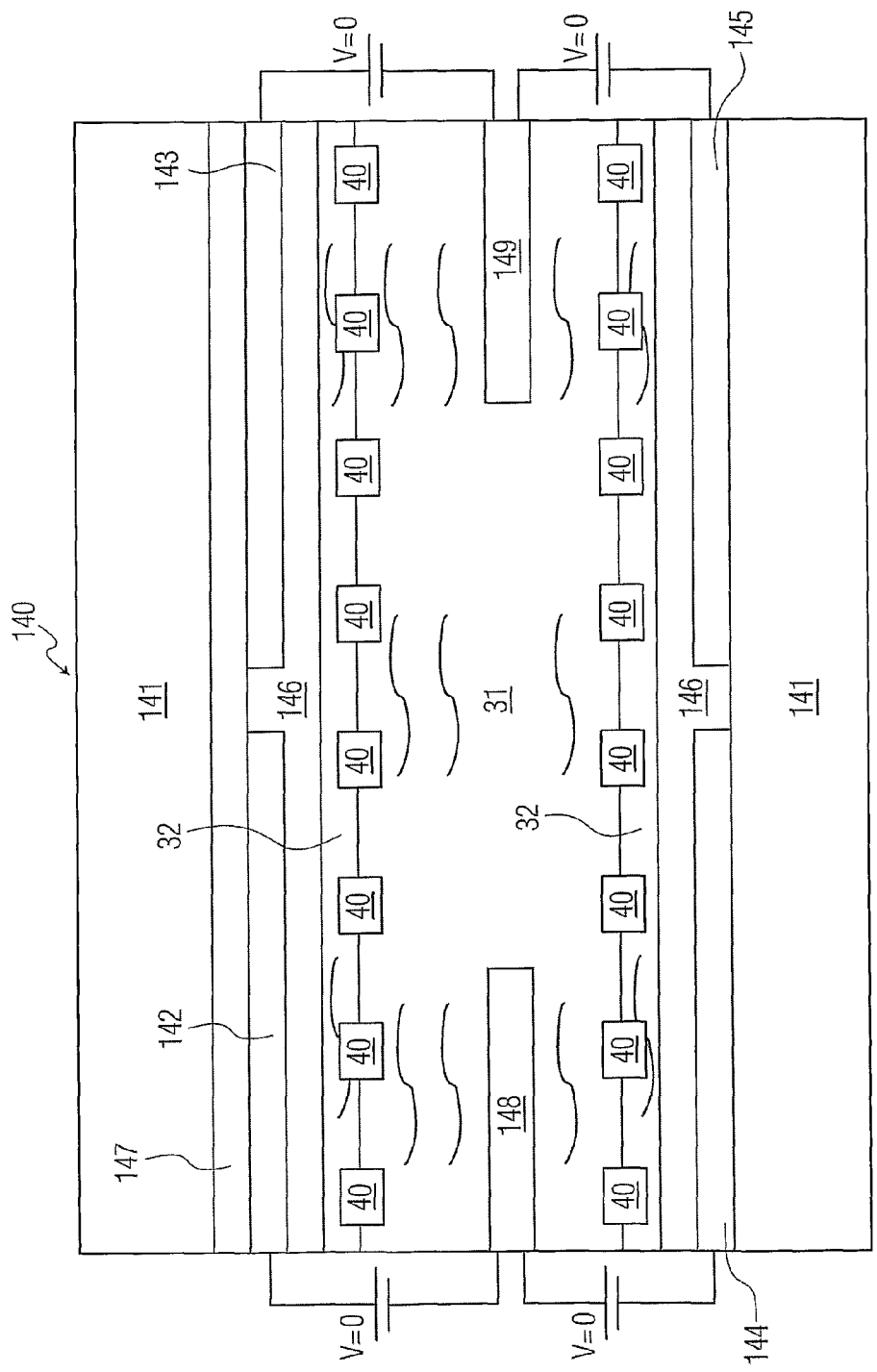
FIGS. 13A and 13B illustrate a tenth embodiment of an optical device in accordance with the present invention.
Figure 13B:
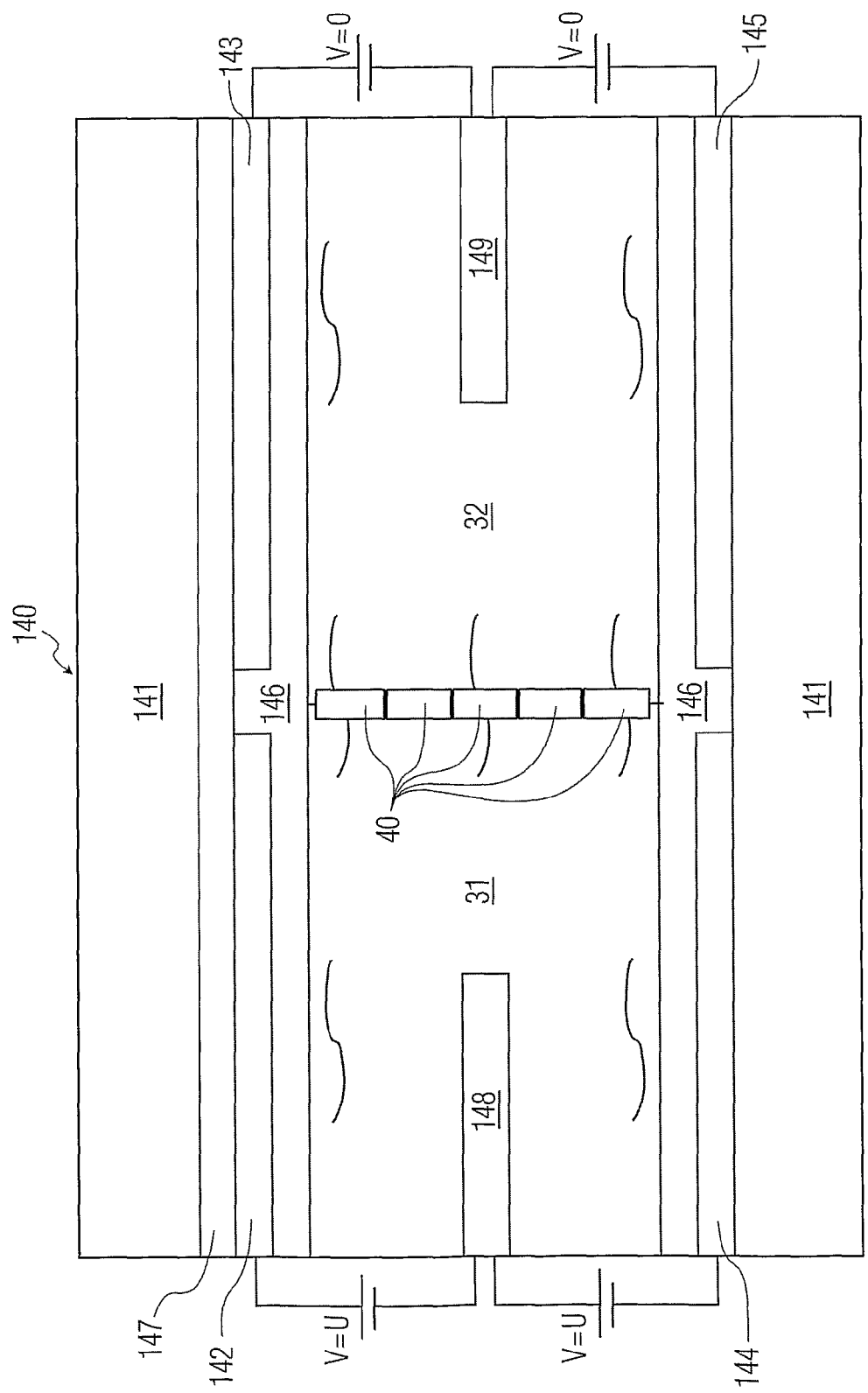

FIGS. 13A and 13B illustrate an optical device 140 having a cell defined by a pair of glass substrates 141, four (4) electrodes 142-145, a pair of hydrophobic layers 146 and a color filter 147 (e.g., green). Within the cell, fluid host medium 30 (FIG. 2A) includes polar liquid 31 and apolar liquid 32 with an interfacing of polar liquid 31 and apolar liquid 32 is shown as a dashed line to facilitate an unambiguous illustration of the interface. Disposed within fluid host medium 30 are a pair of electrodes 148 and 149. Suspended within fluid host medium 30 are flakes 40 (FIG. 3A), each having hydrophilic layer 41 interfacing with polar liquid 31, and hydrophobic layer 42 interfacing with apolar liquid 32. Furthermore, each flake 40 can reflect or absorb light.

In the absence of a potential being applied between electrodes 142-145, 148 and 149 as illustrated in FIG. 13A, apolar liquid 32 spreads over both hydrophobic layers 146 whereby flakes 40 are spread over the interface of polar liquid 31 and apolar liquid 3s on both sides. The result is a switching of optical device 140 to an optical state suitable for reflecting both preventing a transmission of light upwardly through optical device 140. When potential V is applied between electrodes 142 and 148, and between electrodes 144 and 148 as illustrated in FIG. 12B, polar liquid 31 interfaces electrode 148 and hydrophobic layers 146, and apolar liquid 32 interfaces with electrode 149 and hydrophobic layers 146 whereby light upwardly transmitting through optical device 140 can be seen as a green light from an observer above optical device 140.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. An optical device, comprising:
   a fluid host medium including a polar liquid and an apolar liquid;
   a cell enclosing the fluid host medium, wherein the cell includes at least one hydrophilic layer interfacing with the polar liquid and at least one hydrophobic layer interfacing with the apolar liquid; and
   at least one electro-optically sensitive flake disposed within the fluid host medium to facilitate a switching of the optical device among a plurality of optical states including at least one of a light reflecting state, a light absorbing state, a light fluorescing state, and a light transmitting state.

2. The optical device of claim 1, wherein the at least one flake orients its long axis along an electric field applied to the fluid host medium.

3. The optical device of claim 1, wherein an orientation of the at least one flake is altered based on a relative movement of the polar liquid and the apolar liquid in response to an electro-wetting involving an application of a DC electric field to the fluid host medium.

4. The optical device of claim 1, wherein the at least one flake orients itself based on a relative movement of the polar liquid and the apolar liquid in response to an electro-wetting involving an application of a DC electric field to the fluid host medium.

5. The optical device of claim 1, wherein the at least one flake includes a hydrophilic layer interfacing with the polar liquid and a hydrophobic layer interfacing with the apolar liquid.

6. The optical device of claim 1, further comprising:
   a cell enclosing the fluid host medium, wherein the cell includes at least one transparent conducting layer interfacing with at least one of the polar liquid and the apolar liquid.

7. The optical device of claim 1, further comprising:
   a first electro-optically sensitive flake disposed within at least one of the polar liquid and the apolar liquid.

8. The optical device of claim 7, further comprising:
   a cell enclosing the fluid host medium, wherein the first electro-optically sensitive flake is partially bound to the cell.

9. The optical device of claim 1, wherein the at least one flake includes a hydrophilic layer for reflecting a first color and a hydrophobic layer for reflecting a second color.

10. The optical device of claim 1, further comprising:
a cell enclosing the fluid host medium, wherein the cell includes a color filter layer.

11. An optical device, comprising:
a fluid host medium; and
at least one electro-optically sensitive flake disposed within the fluid host medium, wherein the at least one flake includes a hydrophilic layer and a hydrophobic layer to facilitate a switching of the optical device among a plurality of optical states including at least one of a light reflecting state, a light absorbing state, a light fluorescing state, and a light transmitting state.

12. The optical device of claim 11, wherein the at least one flake orients its long axis along an electric field applied to the fluid host medium.

13. The optical device of claim 11, wherein an orientation of the at least one flake is altered based on fluid movement within the fluid host medium in response to an electro-wetting involving an application of a DC electric field to the fluid host medium.

14. The optical device of claim 11, wherein the at least one flake orients itself based on fluid movement within the fluid host medium in response to an electro-wetting involving an application of a DC electric field to the fluid host medium.

15. The optical device of claim 11,
wherein the fluid host medium includes a polar liquid; and
wherein the at least one flake includes a hydrophilic layer interfacing with the polar liquid.

16. The optical device of claim 11, further comprising:
a cell enclosing the fluid host medium,
wherein the fluid host medium includes a polar liquid, and
wherein the cell includes at least one of a hydrophilic layer and a hydrophobic layer interfacing with the polar liquid.

17. The optical device of claim 11, further comprising:
a cell enclosing the fluid host medium,
wherein the fluid host medium includes a polar liquid, and
wherein the cell includes at least one transparent conducting layer interfacing with the polar liquid.

18. The optical device of claim 11,
wherein the fluid host medium includes an apolar liquid; and
wherein the at least one flake includes a hydrophobic layer interfacing with the apolar liquid.

19. The optical device of claim 11, further comprising:
a cell enclosing the fluid host medium,
wherein the fluid host medium includes an apolar liquid, and
wherein the cell includes at least one of a hydrophilic layer and a hydrophobic layer interfacing with the apolar liquid.

20. The optical device of claim 11, further comprising:
a cell enclosing the fluid host medium,
wherein the fluid host medium includes an apolar liquid, and
wherein the cell includes at least one transparent conducting layer interfacing with the apolar liquid.

21. The optical device of claim 11, wherein the hydrophilic layer reflects a first color and the hydrophobic layer reflects a second color.

22. The optical device of claim 11, further comprising:
a cell enclosing the fluid host medium, wherein the cell includes a color filter layer.

23. An optical device, comprising:
a cell;
a fluid host medium enclosed by the cell, the fluid host medium including a polar liquid and an apolar liquid; and
at least one electro-optically sensitive flake disposed within the fluid host medium, the at least one flake including a hydrophilic layer and a hydrophobic layer,
wherein the at least one flake has a first predetermined orientation within the fluid host medium-in the absence of an application of an electric field to the fluid host medium, and
wherein the at least one flake has a second predetermined orientation within the fluid host medium-in response to the application of the electric field to the fluid host medium.

24. The optical device of claim 1, wherein the at least one flake further comprises a plurality of reflective flakes oriented to reflect light as a mirror with a curved surface.

25. The optical device of claim 11, wherein the at least one flake further comprises a plurality of reflective flakes oriented to reflect light as a mirror with a curved surface.

26. An optical device, comprising:
a fluid host medium including a polar liquid and an apolar liquid; and
at least one electro-optically sensitive flake disposed within the fluid host medium to facilitate a switching of the optical device among a plurality of optical states including at least one of a light reflecting state, a light absorbing state, a light fluorescing state, and a light transmitting state, wherein the at least one flake includes a hydrophilic layer for reflecting a first color and a hydrophobic layer for reflecting a second color.

27. The optical device of claim 26, wherein the at least one flake orients its long axis along an electric field applied to the fluid host medium.

28. The optical device of claim 26, wherein an orientation of the at least one flake is altered based on a relative movement of the polar liquid and the apolar liquid in response to an electro-wetting involving an application of a DC electric field to the fluid host medium.

29. The optical device of claim 26, wherein the at least one flake orients itself based on a relative movement of the polar liquid and the apolar liquid in response to an electro-wetting involving an application of a DC electric field to the fluid host medium.

30. The optical device of claim 26, wherein the at least one flake includes a hydrophilic layer interfacing with the polar liquid and a hydrophobic layer interfacing with the apolar liquid.

31. The optical device of claim 26, further comprising a cell enclosing the fluid host medium.

32. The optical device of claim 31, wherein the cell includes at least one transparent conducting layer interfacing with at least one of the polar liquid and the apolar liquid.

33. The optical device of claim 31, wherein the cell includes a color filter layer.

* * * * *